(12) United States Patent
Inoue

(10) Patent No.: US 11,898,630 B2
(45) Date of Patent: Feb. 13, 2024

(54) VEHICLE DRIVE APPARATUS

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 4 days.

(21) Appl. No.: 17/639,538

(22) PCT Filed: Sep. 29, 2020

(86) PCT No.: PCT/JP2020/036900
§ 371 (c)(1),
(2) Date: Mar. 1, 2022

(87) PCT Pub. No.: WO2021/095379
PCT Pub. Date: May 20, 2021

(65) Prior Publication Data
US 2022/0316582 A1 Oct. 6, 2022

(30) Foreign Application Priority Data

Nov. 14, 2019 (JP) .................................. 2019-206357
Feb. 28, 2020 (JP) .................................. 2020-034284

(51) Int. Cl.
*F16H 57/04* (2010.01)
*B60K 1/00* (2006.01)
(Continued)

(52) U.S. Cl.
CPC ........... *F16H 57/0483* (2013.01); *B60K 1/00* (2013.01); *B60K 17/165* (2013.01);
(Continued)

(58) Field of Classification Search
CPC ............... F16H 57/0483; F16H 57/037; F16H 57/0404; F16H 57/0423; F16H 57/0439;
(Continued)

(56) References Cited

U.S. PATENT DOCUMENTS 5,662,188 A       9/1997  Ito et al.
2013/0274053 A1*  10/2013 Bauerlein ................ H02K 7/14
                                                                310/67 R
(Continued)

FOREIGN PATENT DOCUMENTS

EP    2 284 030 A1    2/2011
JP    H06-81929 A     3/1994
(Continued)

OTHER PUBLICATIONS

Jun. 24, 2022 extended Search Report issued in European Patent Application No. 20887235.8.
(Continued)

*Primary Examiner* — Colby M Hansen
(74) *Attorney, Agent, or Firm* — Oliff PLC

(57) ABSTRACT

A rotating electrical machine and an input member are placed on a first axis, a counter gear mechanism is placed on a second axis, and a differential gear mechanism is placed on a third axis. The input member, the counter gear mechanism, and the differential gear mechanism have portions placed on an axial first side with respect to the rotating electrical machine. A pump portion is placed on the opposite side of an imaginary plane passing through the first axis and the third axis from the second axis, and is placed at a location that overlaps at least one of the rotating electrical machine and the differential gear mechanism in an axial view. The pump portion is placed on the axial first side with respect to the rotating electrical machine.

22 Claims, 6 Drawing Sheets

(51) Int. Cl.
*B60K 17/16* (2006.01)
*F16H 57/03* (2012.01)
*H02K 9/19* (2006.01)
*F16H 57/037* (2012.01)
*F16H 63/34* (2006.01)
*F16H 57/02* (2012.01)

(52) U.S. Cl.
CPC ....... *F16H 57/037* (2013.01); *F16H 57/0404* (2013.01); *F16H 57/0423* (2013.01); *F16H 57/0439* (2013.01); *F16H 57/0476* (2013.01); *F16H 63/3416* (2013.01); *H02K 9/19* (2013.01); *B60K 2001/001* (2013.01); *F16H 2057/02034* (2013.01); *F16H 2057/02052* (2013.01)

(58) Field of Classification Search
CPC ....... F16H 57/0476; F16H 2057/02034; F16H 2057/02052; B60K 1/00; B60K 17/165; B60K 2001/001; H02K 9/19
USPC .......................................................... 475/150
See application file for complete search history.

(56) References Cited

U.S. PATENT DOCUMENTS

| | | | |
|---|---|---|---|
| 2017/0320382 A1* | 11/2017 | Milton | ..................... B60G 3/20 |
| 2018/0215255 A1* | 8/2018 | Kronsteiner | ........... B60K 17/04 |
| 2019/0229582 A1 | 7/2019 | Ito et al. | |
| 2019/0285168 A1 | 9/2019 | Ikeda et al. | |

FOREIGN PATENT DOCUMENTS

| | | |
|---|---|---|
| JP | H08-105520 A | 4/1996 |
| JP | H09-175349 A | 7/1997 |
| JP | 2010-233293 A | 10/2010 |
| JP | 2019-106776 A | 6/2019 |
| JP | 2019-129608 A | 8/2019 |
| WO | 2015/041274 A1 | 3/2015 |
| WO | 2019/208642 A1 | 10/2019 |

OTHER PUBLICATIONS

Nov. 24, 2020 International Search Report issued in International Patent Application No. PCT/JP2020/036900.

* cited by examiner

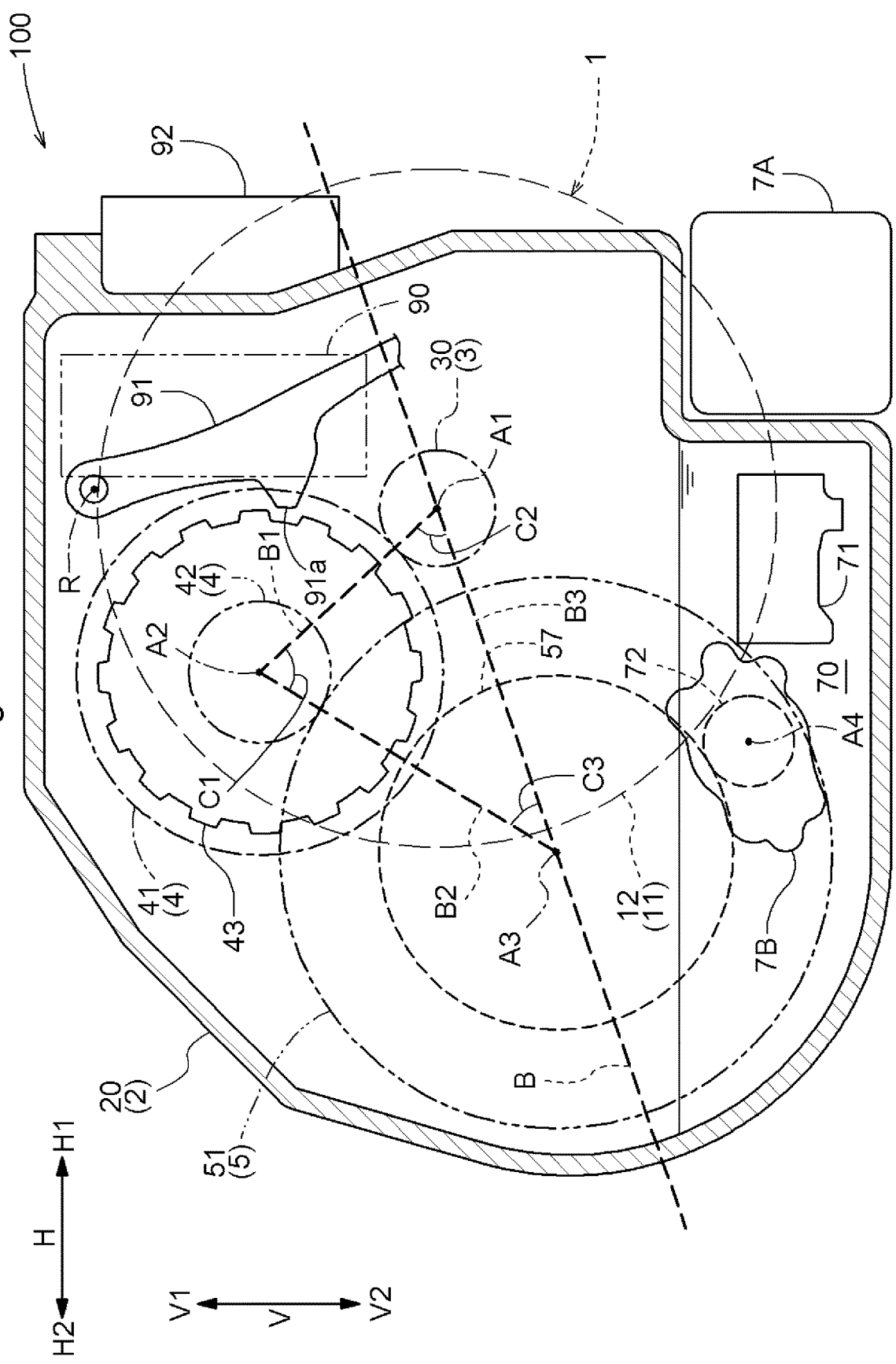

VEHICLE DRIVE APPARATUS

TECHNICAL FIELD

The present disclosure relates to a vehicle drive apparatus provided with: a rotating electrical machine; a counter gear mechanism; a differential gear mechanism that distributes, to a first wheel and a second wheel, a driving force transmitted thereto from the rotating electrical machine via the counter gear mechanism; a case that houses these; and a pump portion that suctions a coolant and discharges the coolant into the case.

BACKGROUND ART

One example of a vehicle drive apparatus like the one described above is disclosed in Japanese Unexamined Patent Application Publication No. 2019-129608 (Patent Document 1). Reference signs in parentheses shown hereafter in the description of the background art section are those used in Patent Document 1. A drive apparatus (14) of Patent Document 1 is provided with: an electric motor (12); a gear mechanism (22) drivingly coupled to the electric motor (12); a differential device (24) that distributes, to a pair of left and right drive wheels, a driving force transmitted thereto from the electric motor (12) via the gear mechanism (22); a case (18) that houses these, and an electric oil pump (44) that suctions oil and discharges the oil into the case (18). As illustrated in FIG. 1 and FIG. 4 of Patent Document 1, a first rotating shaft (22a) of both the electric motor (12) and the gear mechanism (22) is supported rotatably around a first rotational axis (C1), a second rotating shaft (22e) of the gear mechanism (22) is supported rotatably around a third rotational axis (C3), and the differential device (24) is supported rotatably around a second rotational axis (C2).

RELATED ART DOCUMENTS

Patent Documents

Patent Document 1: Japanese Unexamined Patent Application Publication No. 2019-129608

SUMMARY OF THE DISCLOSURE

Problem to be Solved by the Invention

Incidentally, a limited amount of space for mounting a vehicle drive apparatus in vehicles may increase the need for a reduction in the size of a vehicle drive apparatus in an axial view (e.g., the size in a vehicle longitudinal direction). In this regard, a rotating electrical machine (the electric motor in Patent Document 1) and a differential gear mechanism (the differential device in Patent Document 1) both tend to be large in size in the radial direction. For this reason, an inter-axis distance between an axis on which the rotating electrical machine is placed and an axis on which the differential gear mechanism is placed tends to have a great influence on the size of the vehicle drive apparatus in the axial view, and reducing the inter-axis distance is important to reducing the size of the vehicle drive apparatus in the axial view. Further, depending on where a pump portion (the electric oil pump in Patent Document 1) is placed, the vehicle drive apparatus may increase in size and in turn decrease in mountability on a vehicle. Therefore, placing the pump portion appropriately is also important.

As a result, there is a desire to achieve a technology capable of easily reducing the inter-axis distance between the axis on which the rotating electrical machine is placed and the axis on which the differential gear mechanism is placed, and capable of suppressing an increase in the size of the vehicle drive apparatus caused by placement of the pump portion.

Means for Solving the Problem

A vehicle drive apparatus is provided with: a rotating electrical machine provided with a rotor and a stator; an input member drivingly coupled to the rotor; a counter gear mechanism; a differential gear mechanism that distributes, to a first wheel and a second wheel, a driving force transmitted thereto from the rotating electrical machine via the input member and the counter gear mechanism; a case that houses the rotating electrical machine, the input member, the counter gear mechanism, and the differential gear mechanism, and a pump portion that suctions a coolant and discharges the coolant into the case. The rotating electrical machine and the input member are placed on a first axis. The counter gear mechanism is placed on a second axis different from the first axis. The differential gear mechanism is placed on a third axis different from the first axis and the second axis. The input member, the counter gear mechanism, and the differential gear mechanism have portions that are placed on an axial first side with respect to the rotating electrical machine. The axial first side is one side in an axial direction. A side opposite the axial first side in the axial direction is defined as an axial second side. The differential gear mechanism is coupled to the first wheel via a shaft member that is on the third axis and that has a portion placed on the axial second side with respect to the differential gear mechanism. The pump portion is placed on the opposite side of an imaginary plane passing through the first axis and the third axis from the second axis, and is placed at a location that overlaps at least one of the rotating electrical machine and the differential gear mechanism in an axial view that is along the axial direction. The pump portion is placed on the axial first side with respect to the rotating electrical machine.

According this structure, the input member, the counter gear mechanism, and the differential gear mechanism have the respective portions that are placed on the axial first side with respect to the rotating electrical machine, and thus a force transmission mechanism that transmits the driving force between the input member and the differential gear mechanism via the counter gear mechanism is placeable in space on the axial first side with respect to the rotating electrical machine. Placing the force transmission mechanism in this way facilitates placing the differential gear mechanism toward the axial first side. The differential gear mechanism is typically formed to be relatively large in diameter. Therefore, placing the differential gear mechanism toward the axial first side facilitates placing, the first axis on which the rotating electrical machine is placed and the third axis on which the differential gear mechanism is placed, close to each other (i.e., reducing an inter-axis distance between the first axis and the third axis), while avoiding interference between the rotating electrical machine and the differential gear mechanism. Further, reducing the inter-axis distance between the first axis and the third axis allows a reduction in the size of the vehicle drive apparatus in the axial view.

Further, according to the present structure, the pump portion is placed on the opposite side of the imaginary plane passing through the first axis and the third axis from the second axis and is placed at the location that overlaps at least one of the rotating electrical machine and the differential gear mechanism in the axial view. The rotating electrical machine and the differential gear mechanism both tend to be large in size in the radial direction. Therefore, placing the pump portion at the location that overlaps at least one of the rotating electrical machine and the differential gear mechanism in the axial view in this way allows placement of the pump portion while suppressing an increase in the size of the vehicle drive apparatus in the axial view. Further, since the pump portion is placed on the opposite side of the imaginary plane from the second axis, the pump portion is placeable in such a manner as to have a high degree of overlap with at least one of the rotating electrical machine and the differential gear mechanism while avoiding interference with the counter gear mechanism placed on the second axis. In addition, according to the present structure, the pump portion is placed on the axial first side with respect to the rotating electrical machine. As described above, according to the vehicle drive apparatus of the present disclosure, the force transmission mechanism that transmits the driving force between the input member and the differential gear mechanism is placeable in the space on the axial first side with respect to the rotating electrical machine. Thus, placing the pump portion on the axial first side with respect to the rotating electrical machine allows the placement region of the pump portion in the axial direction to overlap the placement region of the force transmission mechanism in the axial direction. Therefore, it is possible to place the pump portion while suppressing an increase in the size of the vehicle drive apparatus in the axial direction.

Other features and advantages of the vehicle drive apparatus will be better understood from the following description of embodiments described in conjunction with drawings.

BRIEF DESCRIPTION OF THE DRAWINGS

FIG. 6 is a diagram, in an axial view, illustrating the layout of components of the vehicle drive apparatus according to the other embodiment.

MODES FOR CARRYING OUT THE DISCLOSURE

Figure 1:
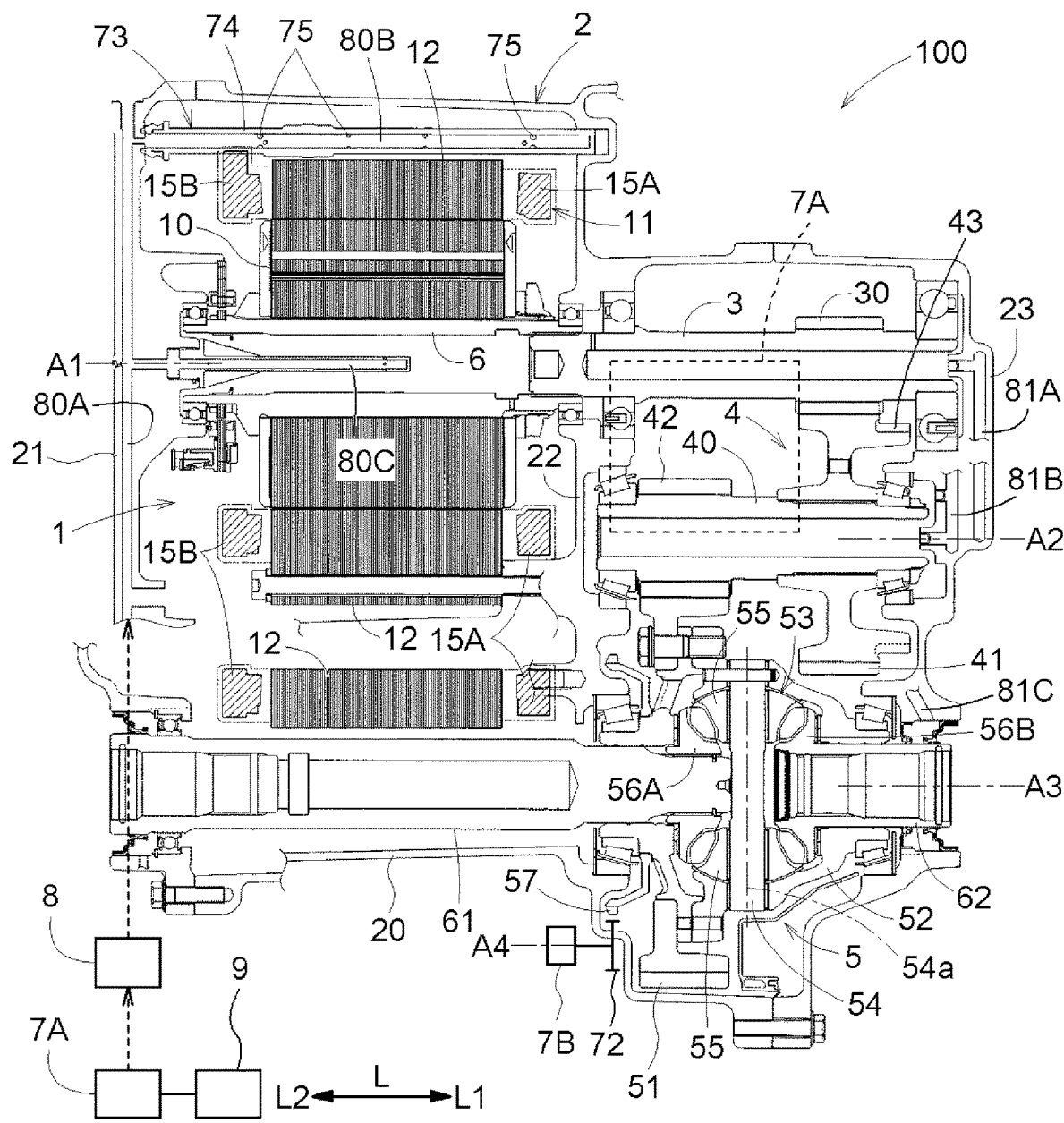
FIG. 1 is a cross sectional view of a vehicle drive apparatus according to an embodiment.

An embodiment of a vehicle drive apparatus is described with reference to the drawings. In the description below, a vertical direction V (refer to FIG. 3 and FIG. 4) means a vertical direction when a vehicle drive apparatus 100 is used, that is, means a vertical direction when the vehicle drive apparatus 100 is placed in an orientation in which the vehicle drive apparatus 100 is used. The vehicle drive apparatus 100 is mounted on a vehicle when used. Therefore, the vertical direction V corresponds to a vertical direction while the vehicle drive apparatus 100 remains mounted on a vehicle, more specifically, corresponds to a vertical direction while a vehicle is at rest on a flat road (a road along a horizontal plane) and while the vehicle drive apparatus 100 remains mounted on the vehicle. Further, an upper side V1 and a lower side V2 mean an upper side and a lower side in the vertical direction V, respectively. In addition, the direction of each member described in the description below indicates the direction of the member when assembled in the vehicle drive apparatus 100. Further, terms related to each member, such as the dimensions, the direction of placement, and the location of placement allow differences due to errors (acceptable manufacturing errors).

In the present description, the term "drivingly coupled" refers to a state where two rotating elements are coupled together such that a driving force (synonymous with torque) is transmittable therebetween, including a state where the two rotating elements are coupled in such a manner as to rotate together as a unit, and a state where the two rotating elements are coupled via one or two or more transmission members such that a driving force is transmittable therebetween. Such a transmission member includes various types of members that transmit rotation while maintaining or changing the rotation speed (e.g., a shaft, a gear mechanism, a belt, a chain, etc.). The transmission member may include an engagement device (e.g., a friction engagement device, an intermesh engagement device, etc.) that selectively transmits rotation and driving force.

In the present description, the term "rotating electrical machine" is used as a concept including a motor (an electric motor), a generator (an alternator), and a motor-generator that serves as either a motor or a generator as needed. In addition, the expression "overlap each other in a predetermined direction view" as used in the present description in connection with placement of two members means that when an imaginary straight line parallel to the direction of the view is moved in directions perpendicular to the imaginary straight line, there is a region where the imaginary straight line crosses both the two members at least in part. Further, the expression "placement regions in a predetermined direction overlap each other" as used in the present description in connection with placement of two members means that at least part of the placement region of one member in the predetermined direction is included within the placement region of the other member in the predetermined direction.

As illustrated in FIG. 1, the vehicle drive apparatus 100 is provided with a rotating electrical machine 1, an input member 3, a counter gear mechanism 4, a differential gear mechanism 5, and a case 2. The case 2 houses the rotating electrical machine 1, the input member 3, the counter gear mechanism 4, and the differential gear mechanism 5. The case 2 also houses a first output member 61 and a second output member 62 that are described later. It is noted that the term "house" means that at least part of an object to be housed is housed therein.

Figure 4:
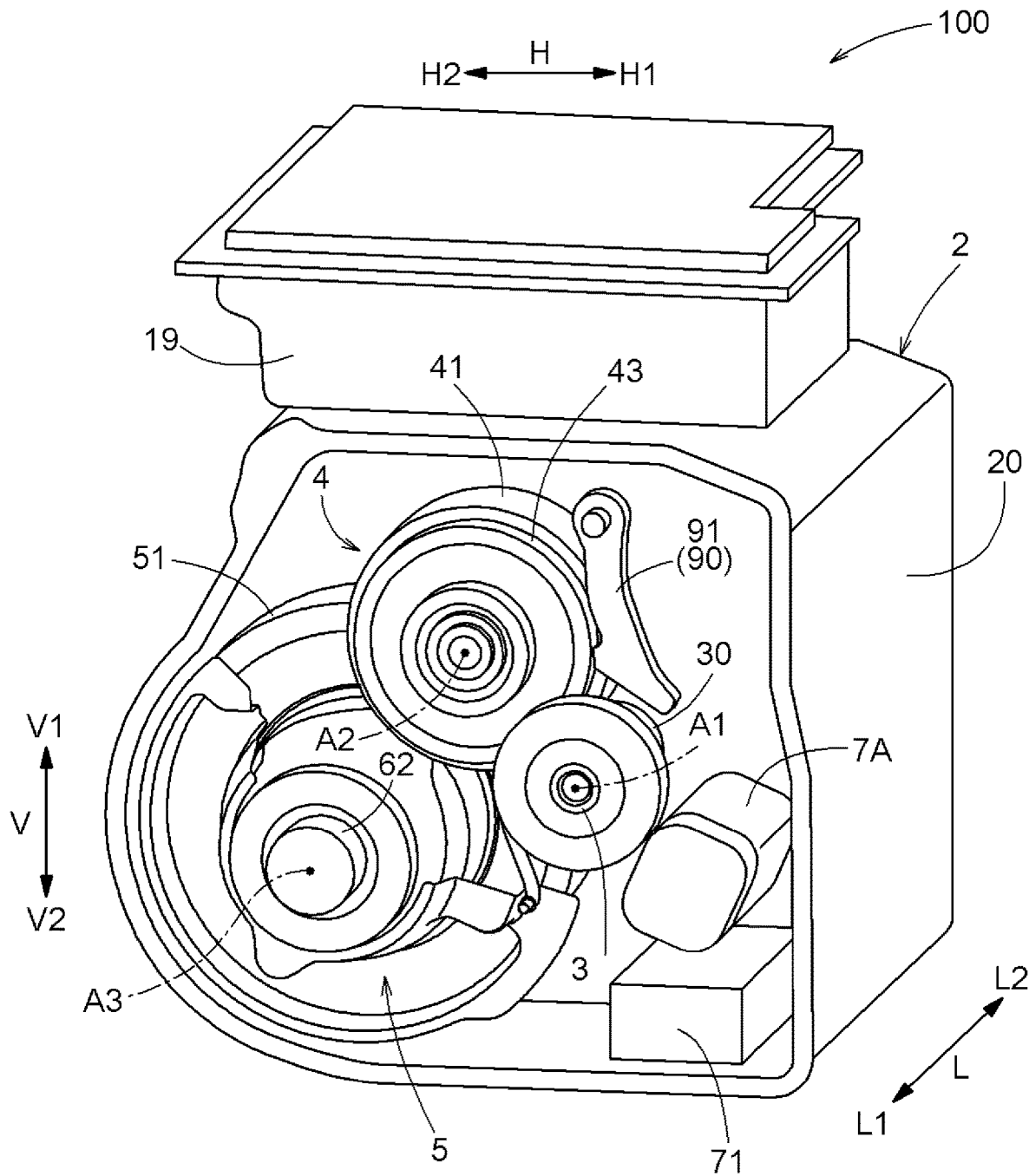
FIG. 4 is a perspective view illustrating a simplified structure of part of the vehicle drive apparatus according to the embodiment.

The vehicle drive apparatus 100 transmits output torque of the rotating electrical machine 1 to a first wheel W1 and a second wheel W2 (refer to FIG. 2), thereby moving a vehicle that has the vehicle drive apparatus 100 mounted thereon. That is, the rotating electrical machine 1 is a driving-force source for the first wheel W1 and the second wheel W2. The first wheel W1 and the second wheel W2 are a pair of left and right wheels of the vehicle (for example, a pair of left and right front wheels or a pair of left and right rear wheels). The rotating electrical machine 1 is electrically connected to an electricity storage device (not illustrated in the drawings), such as a battery or a capacitor. The rotating electrical machine 1 performs powering by receiving electric power supplied from the electricity storage device, or charges the electricity storage device by supplying the electricity storage device with electric power generated by the inertia force of the vehicle. According to the present embodiment, the rotating electrical machine 1 is an alternating-current rotating electrical machine and is driven by three-phase alternating current (one example of multiphase alternating current). As illustrated in FIG. 4, the vehicle drive apparatus 100 is provided with an inverter 19 that drives the rotating electrical machine 1. The rotating electrical machine 1 is electrically connected to the electricity storage device via the inverter 19 that performs power conversion between direct-current power and alternating-current power.

Figure 2:
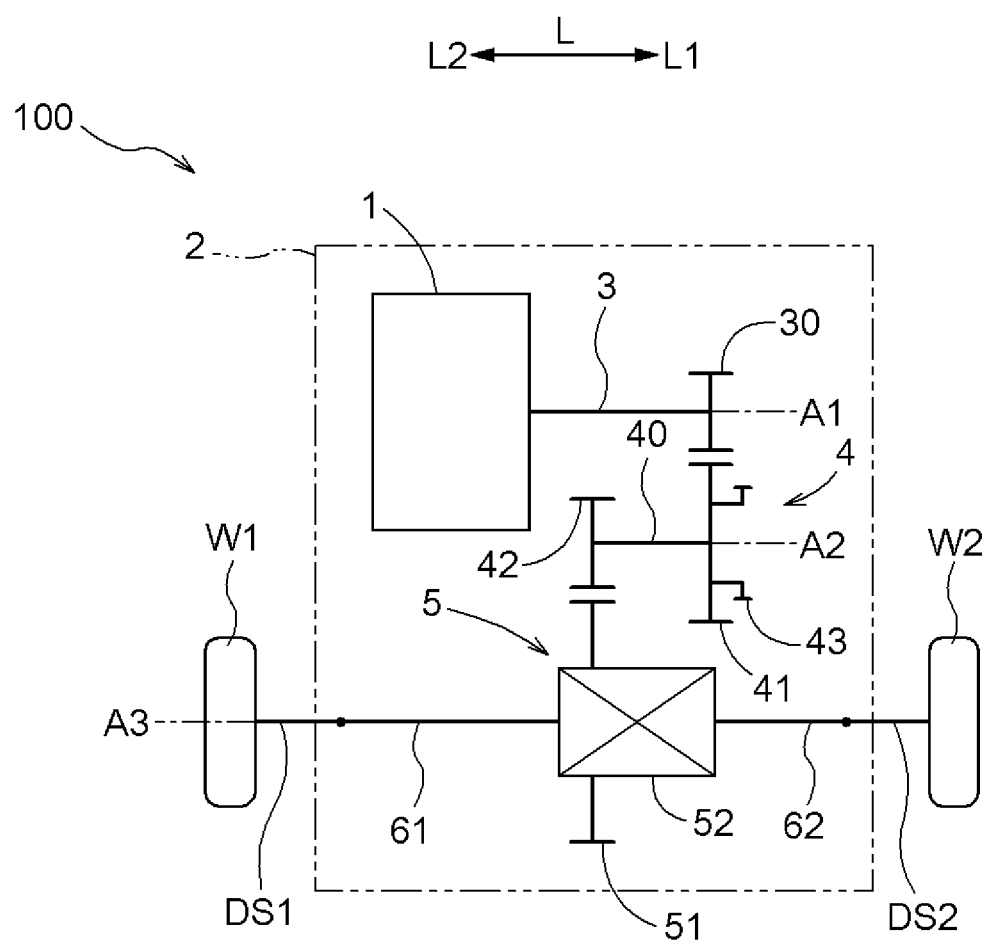
FIG. 2 is a skeleton diagram of the vehicle drive apparatus according to the embodiment.

As illustrated in FIG. 1 and FIG. 2, the rotating electrical machine 1 and the input member 3 are placed on a first axis A1, the counter gear mechanism 4 is placed on a second axis A2 different from the first axis A1, and the differential gear mechanism 5 is placed on a third axis A3 different from the first axis A1 and the second axis A2. The first axis A1, the second axis A2, and the third axis A3 are axes (imaginary axes) placed parallel to each other.

As illustrated in FIG. 1, the rotating electrical machine 1 is provided with a rotor 10 and a stator 11. The stator 11 is fixed to the case 2, and the rotor 10 is supported by the case 2 in such a manner as to be rotatable with respect to the stator 11. According to the present embodiment, the rotating electrical machine 1 is an inner-rotor-type rotating electrical machine. Thus, the stator 11 is placed outside the rotor 10 in a radial direction in such a manner as to overlap the rotor 10 in a radial view that is along a radial direction. The radial direction here refers to a radial direction with reference to the first axis A1 on which the rotating electrical machine 1 is placed, that is, refers to a radial direction with reference to a rotational axis of the rotating electrical machine 1.

The stator 11 is provided with a stator core 12, a first coil end portion 15A protruding from the stator core 12 toward an axial first side L1 that is one side in an axial direction L, and a second coil end portion 15B protruding from the stator core 12 toward an axial second side L2 that is the other side in the axial direction L (the side opposite the axial first side L1 in the axial direction L). The axial direction L here is a direction in which the rotational axis of the rotating electrical machine 1 extends. That is, the axial direction L is a direction parallel to the first axis A1, namely, a common axial direction of the first axis A1, the second axis A2, and the third axis A3. For example, the stator core 12 may be formed by stacking multiple magnetic sheets (e.g., electromagnetic steel sheets such as silicon steel sheets) in the axial direction L, or may be mainly made of a green compact that is formed by pressing powder of a magnetic material. A coil is wound on the stator core 12. A portion of the coil that protrudes from the stator core 12 toward the axial first side L1 forms the first coil end portion 15A, and a portion of the coil that protrudes from the stator core 12 toward the axial second side L2 forms the second coil end portion 15B.

As illustrated in FIG. 1, the input member 3 is drivingly coupled to the rotor 10. Specifically, the input member 3 is coupled to the rotor 10 in such a manner as to rotate as a unit with the rotor 10. According to the present embodiment, the vehicle drive apparatus 100 is provided with a rotor shaft 6 to which the rotor 10 is fixed, and the input member 3 is coupled to the rotor shaft 6 in such a manner as to rotate as a unit with the rotor shaft 6. Specifically, a portion of the input member 3 on the axial second side L2 is coupled (here, splined) to a portion of the rotor shaft 6 on the axial first side L1. Unlike this structure, the vehicle drive apparatus 100 may be provided with no rotor shaft 6, and the rotor 10 may be fixed to the input member 3 (specifically, a portion of the input member 3 on the axial second side L2).

The differential gear mechanism 5 distributes, to the first wheel W1 and the second wheel W2, a driving force transmitted thereto from the rotating electrical machine 1 via the input member 3 and the counter gear mechanism 4. The differential gear mechanism 5 is provided with a differential input gear 51 and distributes, to the first wheel W1 and the second wheel W2, the driving force transmitted from the rotating electrical machine 1 to the differential input gear 51 via the input member 3. As illustrated in FIG. 2, the vehicle drive apparatus 100 is provided with the first output member 61 drivingly coupled to the first wheel W1, and the second output member 62 drivingly coupled to the second wheel W2. The differential gear mechanism 5 distributes, to the first output member 61 and the second output member 62, the driving force transmitted from the rotating electrical machine 1 via the input member 3, thereby distributing the driving force to the first wheel W1 and the second wheel W2.

As illustrated in FIG. 2, according to the present embodiment, the first output member 61 is coupled to the first wheel W1 via a first output shaft DS1. The first output shaft DS1 here is a shaft member that rotates as a unit with the first wheel W1 and is coupled to the first wheel W1 via, for example, a constant velocity joint. The first output member 61 is coupled to the first output shaft DS1 in such a manner as to rotate as a unit with the first output shaft DS1. Specifically, at least a portion of the first output member 61 on the axial second side L2 is formed in the shape of a tube (specifically, in the shape of a cylinder) extending in the axial direction L, and the first output shaft DS1 is inserted from the axial second side L2 into the interior (a space enclosed by the inner circumferential surface) of the first output member 61. Further, an engagement portion formed on an inner circumferential surface of the first output member 61 engages an engagement portion formed on an outer circumferential surface of the first output shaft DS1, and thus the first output member 61 is coupled (here, splined) to the first output shaft DS1. According to the present embodiment, the first output member 61 corresponds to "a shaft member".

According to the present embodiment, the second output member 62 is coupled to the second wheel W2 via a second output shaft DS2. The second output shaft DS2 here is a shaft member that rotates as a unit with the second wheel W2 and is coupled to the second wheel W2 via, for example, a constant velocity joint. The second output member 62 is coupled to the second output shaft DS2 in such a manner as to rotate as a unit with the second output shaft DS2. Specifically, at least a portion of the second output member 62 on the axial first side L1 is formed in the shape of a tube (specifically, in the shape of a cylinder) extending in the axial direction L, and the second output shaft DS2 is inserted from the axial first side L1 into the interior (a space enclosed by the inner circumferential surface) of the second output member 62. Further, an engagement portion formed on an inner circumferential surface of the second output member 62 engages an engagement portion formed on an outer circumferential surface of the second output shaft DS2, and thus the second output member 62 is coupled (here, splined) to the second output shaft DS2.

The first output member 61 and the second output member 62 are placed on the third axis A3. In addition, the first output member 61 is placed on the axial second side L2 with respect to the second output member 62. As illustrated in FIG. 1, the first output member 61 has a portion that is placed on the axial second side L2 with respect to the differential gear mechanism 5. That is, the differential gear mechanism 5 is coupled to the first wheel W1 via the first output member 61 that is on the third axis A3 and that has the portion placed on the axial second side L2 with respect to the differential gear mechanism 5. On the other hand, the second output member 62 has a portion that is placed on the axial first side L1 with respect to the differential gear mechanism 5. That is, the differential gear mechanism 5 is coupled to the second wheel W2 via the second output member 62 that is on the third axis A3 and that has the portion placed on the axial first side L1 with respect to the differential gear mechanism 5.

As illustrated in FIG. 1, according to the present embodiment, the differential gear mechanism 5 is a bevel gear type of differential gear mechanism. The differential gear mechanism 5 is provided with a gear group 53 and a differential case portion 52 that encloses the gear group 53. The differential case portion 52 is supported by the case 2 in such a manner as to be rotatable with respect to the case 2. The differential input gear 51 is coupled to the differential case portion 52 in such a manner as to rotate as a unit with the differential case portion 52. Specifically, the differential input gear 51 is mounted to the differential case portion 52 in such a manner as to protrude outward in a radial direction (in a radial direction with reference to the third axis A3) from the differential case portion 52. The differential input gear 51 is a gear that meshes with a gear (specifically, a second gear 42 that is described later) provided in the counter gear mechanism 4 and that rotates as a unit with the differential case portion 52. According to the present embodiment, the differential input gear 51 is placed on the axial second side L2 with respect to a pinion shaft 54 that is described later. Specifically, a center axis 54*a* (an imaginary axis) of the pinion shaft 54 is placed on the axial first side L1 with respect to the differential input gear 51.

The gear group 53 includes pinion gears 55, and a first side gear 56A and a second side gear 56B that each mesh with the pinion gears 55. The pinion gears 55 (for example, two pinion gears 55) are supported by the pinion shaft 54 held in the differential case portion 52 in such a manner as to be rotatable with respect to the pinion shaft 54. The pinion shaft 54 is held in the differential case portion 52 in such a manner as to extend along a direction that is perpendicular to the axial direction L. That is, the differential gear mechanism 5 is provided with the pinion shaft 54 extending along the direction perpendicular to the axial direction L. The first side gear 56A is placed on the axial second side L2 with respect to the pinion shaft 54, and the second side gear 56B is placed on the axial first side L1 with respect to the pinion shaft 54. The differential gear mechanism 5 distributes rotation of the differential input gear 51 to the first side gear 56A and the second side gear 56B. Alternatively, the differential gear mechanism 5 may be structured as a planetary gear type of differential gear mechanism, and in this instance, the gear group 53 includes, for example, pinion gears supported by a carrier, and a sun gear and a ring gear that each mesh with the pinion gears.

The first side gear 56A rotates as a unit with the first output member 61, and the second side gear 56B rotates as a unit with the second output member 62. According to the present embodiment, the first side gear 56A is formed on a member separate from a member that structures the first output member 61, and the first side gear 56A is coupled (here, splined) to the first output member 61 in such a manner as to rotate as a unit with the first output member 61. The first side gear 56A is coupled to an end portion of the first output member 61 on the axial first side L1. Further, according to the present embodiment, the second side gear 56B is formed on a member that structures the second output member 62. Specifically, the second side gear 56B is formed on an end portion of the second output member 62 on the axial second side L2.

The counter gear mechanism 4 drivingly couples the input member 3 and the differential gear mechanism 5. The counter gear mechanism 4 is provided with a first gear 41 that meshes with an input gear 30 that rotates as a unit with the input member 3, and a second gear 42 that meshes with the differential input gear 51 provided in the differential gear mechanism 5. The counter gear mechanism 4 is further provided with a counter shaft 40 that couples the first gear 41 and the second gear 42 together. The first gear 41 and the second gear 42 rotate as a unit with the counter shaft 40. According to the present embodiment, the second gear 42 and the differential input gear 51 are placed on the axial second side L2 with respect to the first gear 41 and the input gear 30. Rotation of the input member 3 is inputted to the differential gear mechanism 5 via the counter gear mechanism 4. According to the present embodiment, the first gear 41 is formed to be larger in diameter than the input gear 30, and the second gear 42 is formed to be smaller in diameter than the differential input gear 51. Thus, the rotation of the input member 3 is reduced in speed in accordance with the gear ratio between the input gear 30 and the first gear 41, is then further reduced in speed in accordance with the gear ratio between the second gear 42 and the differential input gear 51 (i.e., subjected to a double reduction in speed), and is then inputted to the differential gear mechanism 5.

As illustrated in FIG. 1, the case 2 is provided with a peripheral wall portion 20, a first wall portion 21, a second wall portion 22, and a third wall portion 23. The peripheral wall portion 20 is formed in the shape of a tube (here, in the shape of a tube having different cross-sectional shapes at different positions along the axial direction L) extending in the axial direction L. The second wall portion 22 is placed on the axial first side L1 with respect to the first wall portion 21, and the third wall portion 23 is placed on the axial first side L1 with respect to the second wall portion 22. An interior space of the case 2 is enclosed and formed by the peripheral wall portion 20, the first wall portion 21, and the third wall portion 23, and is partitioned in the axial direction L by the second wall portion 22. It is noted that FIG. 4 illustrates when the third wall portion 23 is not attached to the peripheral wall portion 20 yet.

As illustrated in FIG. 1, the input member 3 has a portion that is placed on the axial first side L1 with respect to the rotating electrical machine 1. According to the present embodiment, the rotating electrical machine 1 is placed between the first wall portion 21 and the second wall portion 22 in the axial direction L. The rotor shaft 6 is supported by a bearing on the first wall portion 21 and is also supported by another bearing on the second wall portion 22. On the other hand, the input member 3 is supported by a bearing on the second wall portion 22 and is also supported by another bearing on the third wall portion 23. A portion of the input member 3 that is placed between the second wall portion 22 and the third wall portion 23 in the axial direction L is placed on the axial first side L1 with respect to the rotating electrical machine 1. The input gear 30, which rotates as a unit with the input member 3, is placed between the second wall portion 22 and the third wall portion 23 in the axial direction L. That is, the input gear 30 is provided in the portion of the input member 3 that is placed on the axial first side L1 with respect to the rotating electrical machine 1.

The counter gear mechanism 4 has a portion that is placed on the axial first side L1 with respect to the rotating electrical machine 1. According to the present embodiment, the counter shaft 40 is supported by a bearing on the second wall portion 22 and is also supported by another bearing on the third wall portion 23. Further, the first gear 41 and the second gear 42 are placed between the second wall portion 22 and the third wall portion 23 in the axial direction L.

The differential gear mechanism 5 has a portion that is placed on the axial first side L1 with respect to the rotating electrical machine 1. According to the present embodiment, the differential case portion 52 is supported by a bearing on the second wall portion 22 and is also supported by another bearing on the third wall portion 23. Further, the gear group 53 and the differential input gear 51 are placed on the axial first side L1 with respect to the rotating electrical machine 1. That is, according to the present embodiment, the gear group 53, which structures the differential gear mechanism 5, is placed on the axial first side L1 with respect to the stator 11. Placing the gear group 53 at a different location from the stator 11 in the axial direction L in this way facilitates placing the first axis A1 and the third axis A3 close to each other while avoiding interference between the rotating electrical machine 1 and the differential gear mechanism 5. According to the present embodiment, the stator 11 is placed in such a manner as to overlap the gear group 53 in an axial view that is along the axial direction L. The first output member 61 is placed in such a manner as to extend along the axial direction L through a through hole formed in the second wall portion 22, and is supported by a bearing on the first wall portion 21. According to the present embodiment, the first output member 61 is placed in such a manner as to face the stator 11 in the radial direction (the radial direction with reference to the first axis A1, the same applies hereinafter). Here, the stator 11 and the first output member 61 are placed in such a manner as to directly face each other in the radial direction (in other words, in such a manner as to directly face each other in the radial direction with a space therebetween).

As described above, the input member 3, the counter gear mechanism 4, and the differential gear mechanism 5 have the respective portions that are placed on the axial first side L1 with respect to the rotating electrical machine 1. Further, the portion of the input member 3 that is placed on the axial first side L1 with respect to the rotating electrical machine 1 is drivingly coupled via the counter gear mechanism 4 to the portion of the differential gear mechanism 5 that is placed on the axial first side L1 with respect to the rotating electrical machine 1.

As illustrated in FIG. 1, according to the present embodiment, the counter gear mechanism 4 is provided with a parking gear 43. The parking gear 43 is provided in such a manner as to rotate as a unit with the counter shaft 40. According to the present embodiment, the parking gear 43 is placed on the axial first side L1 with respect to the first gear 41. Here, the first gear 41 and the parking gear 43 are formed on the outer perimeter of the same member in such a manner as to be adjacent to each other in the axial direction L.

Figure 3:
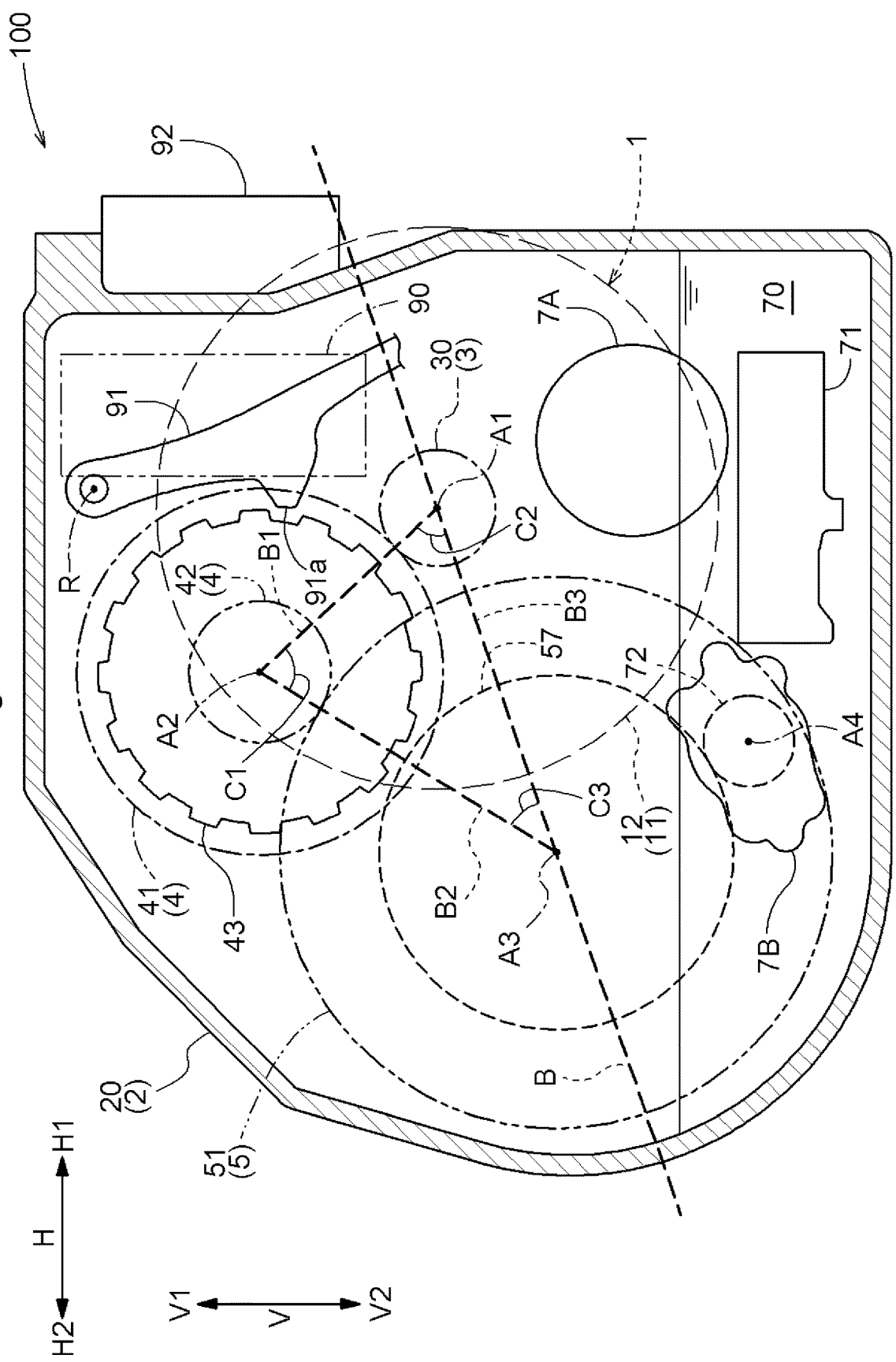
FIG. 3 is a diagram, in an axial view, illustrating the layout of components of the vehicle drive apparatus according to the embodiment.

The vehicle drive apparatus 100 is provided with a parking lock mechanism 90 that is configured to be locked with the parking gear 43. When the parking lock mechanism 90 is locked with the parking gear 43 so as to restrict rotation of the parking gear 43, the wheels (the first wheel W1 and the second wheel W2) are locked. As illustrated in FIG. 3 and FIG. 4, the parking lock mechanism 90 is provided with a parking pawl 91 that engages with or disengages from the parking gear 43. The parking pawl 91 here is supported by the case 2 in such a manner as to be swingable about a swing axis R and engages with or disengages from the parking gear 43 by swinging about the swing axis R. The swing axis R is an imaginary axis and, according to the present embodiment, is placed parallel to the axial direction L. The parking pawl 91 has a pawl portion 91a that is configured to engage with a tooth space (a space formed between teeth) in the parking gear 43. When the parking pawl 91 rotates about the swing axis R to a position where the pawl portion 91a engages with the parking gear 43, the rotation of the parking gear 43 is restricted. In contrast, when the parking pawl 91 rotates about the swing axis R to a position where the pawl portion 91a disengages from the parking gear 43, the rotation of the parking gear 43 is allowed. The parking pawl 91 is biased by a biasing member (not illustrated in the drawings) in a direction that keeps the pawl portion 91a away from the parking gear 43.

As illustrated briefly in FIG. 3, the vehicle drive apparatus 100 is provided with an actuator 92 that actuates the parking lock mechanism 90. The actuator 92 may be, for example, an electric actuator. The actuator 92 here is placed outside the case 2. Although not described in details, the parking lock mechanism 90 is provided with a swing mechanism that swings the parking pawl 91 about the swing axis R by using a driving force of the actuator 92. This swing mechanism is provided with, for example, a parking rod that is moved along a predetermined direction (e.g., the axial direction L) by the driving force of the actuator 92, and a cam member that is supported by the parking rod and that swings the parking pawl 91 about the swing axis R in accordance with reciprocating movement of the parking rod along the predetermined direction.

As illustrated in FIG. 1, FIG. 3, and FIG. 4, the vehicle drive apparatus 100 is provided with a first pump portion 7A that suctions a coolant and discharges the coolant into the case 2. Although the first pump portion 7A is placed either inside or outside the case 2, the coolant discharged from the first pump portion 7A is supplied into the case 2 in either instance. As illustrated in FIG. 3 and FIG. 4, according to the present embodiment, the first pump portion 7A is placed inside the case 2. Further, according to the present embodiment, the coolant is oil, and as illustrated in FIG. 3, a coolant reservoir portion 70 that stores the coolant is formed inside the case 2. The first pump portion 7A suctions the coolant in the coolant reservoir portion 70. Specifically, the vehicle drive apparatus 100 is provided with a strainer 71 that filters the coolant to be suctioned by the first pump portion 7A, and the first pump portion 7A suctions the coolant in the coolant reservoir portion 70 through the strainer 71. According to the present embodiment, since the coolant is oil, the first pump portion 7A is a hydraulic pump that generates hydraulic pressure by suctioning oil. According to the present embodiment, the first pump portion 7A corresponds to "a pump portion".

As illustrated in FIG. 1 and FIG. 3, according to the present embodiment, the vehicle drive apparatus 100 is further provided with a second pump portion 7B that suctions a coolant and discharges the coolant into the case 2. The coolant discharged from the second pump portion 7B is supplied into the case 2. The second pump portion 7B is placed inside the case 2. The second pump portion 7B suctions the coolant in the coolant reservoir portion 70. Specifically, the second pump portion 7B suctions the coolant in the coolant reservoir portion 70 through the strainer 71. According to the present embodiment, since the coolant is oil, the second pump portion 7B is a hydraulic pump that generates hydraulic pressure by suctioning oil. For example, internal gear pumps, external gear pumps, or vane pumps may be used as the first pump portion 7A and the second pump portion 7B. According to the present embodiment, the strainer 71 is a common strainer shared by the first pump portion 7A and the second pump portion 7B. Unlike this structure, the strainer 71 may be structured to have a first filter portion and a second filter portion that are separate from each other. The first filter portion filters the coolant to be suctioned by the first pump portion 7A, and the second filter portion filters the coolant to be suctioned by the second pump portion 7B. In this instance, for example, the first filter portion may be placed either integrally with the second filter portion, or separately from the second filter portion.

As illustrated in FIG. 3, according to the present embodiment, the coolant reservoir portion 70 is formed at a lower portion of the case 2. Specifically, the coolant reservoir portion 70 is formed at a portion of the interior of the case 2 on the lower side V2 (a bottom portion of the case 2). The coolant reservoir portion 70 here is enclosed and formed by the interior surface of a portion of the peripheral wall portion 20 on the lower side V2. That is, the coolant reservoir portion 70 is formed without using an oil pan.

The second pump portion 7B is an oil pump (what is called a mechanical oil pump) that is driven by a force transmitted through a force transmission path that connects the rotating electrical machine 1 and the wheels (the first wheel W1 and the second wheel W2). According to the present embodiment, the second pump portion 7B is driven by rotation of the differential case portion 52. Here, the second pump portion 7B and the differential gear mechanism 5 are placed on different axes. Specifically, the second pump portion 7B is placed on a fourth axis A4 different from the first axis A1, the second axis A2, and the third axis A3. The fourth axis A4 is an axis (an imaginary axis) parallel to the first axis A1, the second axis A2, and the third axis A3. Further, a pump input gear 72 that rotates as a unit with a drive shaft of the second pump portion 7B meshes with a pump drive gear 57 that rotates as a unit with the differential case portion 52. Thus, the second pump portion 7B is driven by rotation of the differential case portion 52.

According to the present embodiment, the coolant discharged from the second pump portion 7B is supplied through a lubrication flow channel to the rotating members and bearings of the vehicle drive apparatus 100 for lubrication thereof. As illustrated in FIG. 1, according to the present embodiment, the lubrication flow channel includes a first lubrication flow channel 81A, a second lubrication flow channel 81B, and a third lubrication flow channel 81C. The first lubrication flow channel 81A, the second lubrication flow channel 81B, and the third lubrication flow channel 81C are formed at the third wall portion 23. The coolant supplied from the second pump portion 7B to the first lubrication flow channel 81A is supplied to the bearing that supports the input member 3. The coolant supplied from the second pump portion 7B to the second lubrication flow channel 81B is supplied to the bearing that supports the counter shaft 40. The coolant supplied from the second pump portion 7B to the third lubrication flow channel 81C is supplied to the bearing that supports the differential case portion 52.

The first pump portion 7A is an oil pump (what is called an electric oil pump) that is driven by an electric motor 9 independent of the force transmission path that connects the rotating electrical machine 1 and the wheels (the first wheel W1 and the second wheel W2). For example, an alternating-current motor that is driven by multiphase (e.g., three-phase) alternating current may be used as the electric motor 9. According to the present embodiment, the electric motor 9 corresponds to "a dedicated driving-force source".

According to the present embodiment, the coolant discharged from the first pump portion 7A is supplied through a cooling flow channel to portions of the rotating electrical machine 1 to be cooled, so as to cool the portions. As illustrated in FIG. 1, according to the present embodiment, the cooling flow channel includes a first cooling flow channel 80A, a second cooling flow channel 80B, and a third cooling flow channel 80C. The first cooling flow channel 80A is formed at the first wall portion 21. According to the present embodiment, the coolant discharged from the first pump portion 7A is supplied to the first cooling flow channel 80A after passing through an oil cooler 8 that is a heat exchanger for cooling the coolant. The second cooling flow channel 80B and the third cooling flow channel 80C are connected in parallel to the first cooling flow channel 80A, and the coolant discharged from the first pump portion 7A is supplied through the first cooling flow channel 80A to both the second cooling flow channel 80B and the third cooling flow channel 80C. Then, the coolant supplied to the second cooling flow channel 80B is supplied to the rotating electrical machine 1 from outside in the radial direction, while the coolant supplied to the third cooling flow channel 80C is supplied to the rotating electrical machine 1 from inside in the radial direction. The radial direction here refers to the radial direction with reference to the first axis A1. According to the present embodiment, the second cooling flow channel 80B corresponds to "a flow channel".

The coolant discharged from the first pump portion 7A is supplied to the rotating electrical machine 1. Specifically, the coolant discharged from the first pump portion 7A and then supplied to the second cooling flow channel 80B is supplied to the stator 11 of the rotating electrical machine 1. That is, according to the present embodiment, the vehicle drive apparatus 100 is provided with a coolant supply portion 73 that supplies the stator 11 with the coolant discharged from the first pump portion 7A. According to the present embodiment, since the coolant is oil, the coolant supply portion 73 is an oil supply portion that supplies the stator 11 with oil for cooling. According to the present embodiment, the coolant supply portion 73 is provided with a supply pipe 74 that is placed in such a manner as to extend along the axial direction L and to face the stator 11 in the radial direction (the radial direction with reference to the first axis A1, the same applies hereinafter). Here, the stator 11 and the supply pipe 74 are placed in such a manner as to directly face each other in the radial direction (in other words, in such a manner as to directly face each other in the radial direction with a space therebetween). The supply pipe 74 is placed outside the stator 11 in the radial direction. Further, the supply pipe 74 is placed on the upper side V1 with respect to the stator 11 in such a manner as to overlap the stator 11 in a vertical view that is along the vertical direction V. According to the present embodiment, the first output member 61 and the supply pipe 74 are placed at different locations in a circumferential direction (a circumferential direction with reference to the first axis A1, the same applies hereinafter). Further, the first output member 61 and the supply pipe 74 face the stator 11 in the radial direction at different locations in the circumferential direction.

The second cooling flow channel 80B described above is formed inside the supply pipe 74. That is, the second cooling flow channel 80B that causes the coolant to flow therethrough is formed inside the supply pipe 74. The supply pipe 74 has a cylindrical inner circumferential surface extending along the axial direction L, and the second cooling flow channel 80B is defined and formed by the cylindrical inner circumferential surface. The supply pipe 74 is supported by the case 2 such that the second cooling flow channel 80B communicates with the first cooling flow channel 80A. Here, an end portion of the supply pipe 74 on the axial second side L2 is supported by the first wall portion 21, and an end portion of the supply pipe 74 on the axial first side L1 is supported by the second wall portion 22.

The supply pipe 74 has a supply hole 75 that supplies the coolant toward the stator 11. Thus, the coolant flowing through the second cooling flow channel 80B is supplied to the stator 11 from the supply hole 75 and cools the stator 11. The supply hole 75 is formed through a peripheral wall portion of the supply pipe 74 to connect the inner circumferential surface and the outer circumferential surface of the supply pipe 74. According to the present embodiment, the supply pipe 74 is provided with multiple supply holes 75. The multiple supply holes 75 include the supply hole 75 that supplies the coolant toward the stator core 12, the supply hole 75 that supplies the coolant toward the first coil end portion 15A, and the supply hole 75 that supplies the coolant toward the second coil end portion 15B.

In this way, according to the present embodiment, oil is supplied as the coolant to the stator 11 so as to cool the stator 11. Unlike this structure, if cooling water is supplied as a coolant to the stator 11 to cool the stator 11, it is generally impossible to supply the cooling water to the stator 11 by dropping or spraying, and therefore, it is necessary to provide a water channel around the stator 11 to allow adequate heat exchange with the stator 11. In many instances, this water channel is provided all around the outer circumferential surface of the stator core 12 in the circumferential direction. Therefore, when cooling water is supplied as the coolant to the stator 11 to cool the stator 11, a reduction in an inter-axis distance between the first axis A1 and the third axis A3 may be hindered by interference between a cooling structure, such as the water channel, and the first output member 61. In contrast, according to the present embodiment, oil is supplied as the coolant to the stator 11 to cool the stator 11, and thus it is possible to cool the stator 11 by supplying oil to the stator 11 by dropping, spraying, etc. Therefore, as compared to when cooling water is supplied as the coolant to the stator 11 to cool the stator 11, a cooling structure for the stator 11 is easily simplified to avoid the likelihood that interference between the cooling structure and the first output member 61 hinders a reduction in the inter-axis distance between the first axis A1 and the third axis A3.

As illustrated in FIG. 3 and FIG. 4, according to the present embodiment, the second axis A2 is placed on the upper side V1 with respect to the first axis A1 and the third axis A3. Further, according to the present embodiment, the first axis A1 is placed on the upper side V1 with respect to the third axis A3. That is, the first axis A1 is placed between the second axis A2 and the third axis A3 in the vertical direction V. According to the present embodiment, the vehicle drive apparatus 100 is mounted on the vehicle in such an orientation that the axial direction L is along a horizontal plane. Thus, the vertical direction V is a direction perpendicular to the axial direction L. Further, according to the present embodiment, the vehicle drive apparatus 100 is mounted on the vehicle in such an orientation that the axial direction L is along a lateral direction of the vehicle. Thus, in the axial view along the axial direction L, a horizontal direction H is a direction along a longitudinal direction of the vehicle. It is noted that in FIG. 3, the reference pitch circle of each gear (except the parking gear 43) is indicated by a dashed line. FIG. 3 and FIG. 4 illustrate one example of the positional relations among the first axis A1, the second axis A2, and the third axis A3 in the vertical direction V As another example, the first axis A1 may be placed at the same height as the third axis A3, the first axis A1 may be placed on the lower side V2 with respect to the third axis A3, the second axis A2 may be placed between the first axis A1 and the third axis A3 in the vertical direction V, or the second axis A2 may be placed on the lower side V2 with respect to the first axis A1 and the third axis A3.

As illustrated in FIG. 3, according to the present embodiment, in the axial view, the first axis A1 and the third axis A3 are placed on different locations in the horizontal direction H. Here, in the axial view, a side on which the first axis A1 is placed with respect to the third axis A3 in the horizontal direction H is defined as a horizontal first side H1. Further, in the axial view, a side opposite the horizontal first side H1 in the horizontal direction H is defined as a horizontal second side H2. According to the present embodiment, in the axial view, the second axis A2 is placed between the first axis A1 and the third axis A3 in the horizontal direction H. That is, in the axial view, the first axis A1, the second axis A2, and the third axis A3 are placed in this order from one side to the other side in the horizontal direction H (in other words, from the horizontal first side H1 to the horizontal second side H2).

Here, as illustrated in FIG. 3, in the axial view along the axial direction L, an imaginary line segment connecting the first axis A1 and the second axis A2 is defined as a first line segment B1, an imaginary line segment connecting the second axis A2 and the third axis A3 is defined as a second line segment B2, and an imaginary line segment connecting the first axis A1 and the third axis A3 is defined as a third line segment B3. Further, in the axial view, an angle formed by the first line segment B1 and the second line segment B2 is defined as a first angle C1, an angle formed by the first line segment B1 and the third line segment B3 is defined as a second angle C2, and an angle formed by the second line segment B2 and the third line segment B3 is defined as a third angle C3. Specifically, an angle (an angle that is less than or equal to 180 degrees, the same applies hereinafter) formed by a vector from the second axis A2 toward the first axis A1 along the first line segment B1 and a vector from the second axis A2 toward the third axis A3 along the second line segment B2 is defined as the first angle C1, an angle formed by a vector from the first axis A1 toward the second axis A2 along the first line segment B1 and a vector from the first axis A1 toward the third axis A3 along the third line segment B3 is defined as the second angle C2, and an angle formed by a vector from the third axis A3 toward the second axis A2 along the second line segment B2 and a vector from the third axis A3 toward the first axis A1 along the third line segment B3 is defined as the third angle C3. That is, of a triangle having vertices at the first axis A1, the second axis A2, and the third axis A3 in the axial view, an interior angle at the vertex structured by the second axis A2 is the first angle C1, an interior angle at the vertex structured by the first axis A1 is the second angle C2, and an interior angle at the vertex structured by the third axis A3 is the third angle C3.

As illustrated in FIG. 3, according to the present embodiment, the first angle C1 is an acute angle. In addition, according to the present embodiment, the first angle C1 is greater than the second angle C2 and the third angle C3. That is, according to the present embodiment, the first angle C1, the second angle C2, and the third angle C3 are all acute angles, and thus the triangle having the vertices at the first axis A1, the second axis A2, and the third axis A3 in the axial view is an acute triangle. In the example illustrated in FIG. 3, the first angle C1 is about 74 degrees, the second angle C2 is about 66 degrees, and the third angle C3 is about 40 degrees. That is, in the example illustrated in FIG. 3, the second angle C2 is greater than the third angle C3. Alternatively, unlike this structure, the third angle C3 may be greater than the second angle C2. Further, the second angle C2 may be greater than the first angle C1 and the third angle C3, or the third angle C3 may be greater than the first angle C1 and the second angle C2. Furthermore, the first angle C1 may be a right angle or an obtuse angle.

As illustrated in FIG. 3, the first pump portion 7A is placed on the opposite side of an imaginary plane B passing through the first axis A1 and the third axis A3 (in other words, including the first axis A1 and the third axis A3) from the second axis A2, and is placed at a location that overlaps at least one of the rotating electrical machine 1 and the differential gear mechanism 5 in the axial view along the axial direction L. The third line segment B3 described above is a segment of the line of intersection of the imaginary plane B and an imaginary plane perpendicular to the axial direction L, between the first axis A1 and the third axis A3. Placing the first pump portion 7A in this way allows placement of the first pump portion 7A while suppressing an increase in the size of the vehicle drive apparatus 100 in the axial view. According to the present embodiment, the second axis A2 is placed on the upper side V1 with respect to the imaginary plane B. As a result, the first pump portion 7A is placed on the lower side V2 with respect to the imaginary plane B. The second pump portion 7B is also placed on the lower side V2 with respect to the imaginary plane B. Further, according to the present embodiment, the first pump portion 7A is placed at a location that overlaps only the rotating electrical machine 1, of the rotating electrical machine 1 and the differential gear mechanism 5, in the axial view. On the other hand, according to the present embodiment, the second pump portion 7B is placed at a location that overlaps only the differential gear mechanism 5, of the rotating electrical machine 1 and the differential gear mechanism 5, in the axial view.

As a placement region of the first pump portion 7A in the axial direction L is indicated by a dashed line in FIG. 1, the first pump portion 7A is placed on the axial first side L1 with respect to the rotating electrical machine 1. According to the present embodiment, the placement region of the first pump portion 7A in the axial direction L overlaps a placement region of the counter gear mechanism 4 in the axial direction L (refer also to FIG. 4). That is, the first pump portion 7A is placed in such a manner as to overlap the counter gear mechanism 4 in the radial view along the radial direction in a partial area in the circumferential direction. It is noted that the circumferential direction here is a circumferential direction with reference to the second axis A2, on which the counter gear mechanism 4 is placed, and that the radial direction here is a radial direction with reference to the second axis A2, on which the counter gear mechanism 4 is placed. Placing the first pump portion 7A in this way allows placement of the first pump portion 7A while suppressing an increase in the size of the vehicle drive apparatus 100 in the axial direction L. According to the present embodiment, the placement region of the first pump portion 7A in the axial direction L overlaps a placement region of the differential gear mechanism 5 in the axial direction L. Further, according to the present embodiment, the placement region of the first pump portion 7A in the axial direction L overlaps a placement region of the input member 3 in the axial direction L.

The strainer 71 is placed on the lower side V2 with respect to the imaginary plane B. According to the present embodiment, as already described, the first pump portion 7A is also placed on the lower side V2 with respect to the imaginary plane B. Thus, according to the present embodiment, the strainer 71 is placed on the same side of the imaginary plane B as the first pump portion 7A. Further, according to the present embodiment, the strainer 71 is placed at a location that overlaps neither the rotating electrical machine 1 nor the differential gear mechanism 5 in the axial view. Alternatively, the strainer 71 may be placed at a location that overlaps at least one of the rotating electrical machine 1 and the differential gear mechanism 5 in the axial view.

As already describe, according to the present embodiment, the first axis A1 is placed on the upper side V1 with respect to the third axis A3. Thus, as illustrated in FIG. 3 and FIG. 4, a relatively large vacant space that overlaps the rotating electrical machine 1 in the axial view is formable on the horizontal first side H1 with respect to the differential gear mechanism 5 and on the lower side V2 with respect to the rotating members placed on the first axis A1, such as the input member 3. This vacant space is formed on the axial first side L1 with respect to the rotating electrical machine 1. According to the present embodiment, this vacant space is used to place the first pump portion 7A, thus allowing placement of the first pump portion 7A while suppressing an increase in the size of the vehicle drive apparatus 100 in the vertical direction V.

According to the present embodiment, the inverter 19 is placed on the upper side V1 with respect to the rotating electrical machine 1 in such a manner as to overlap the rotating electrical machine 1 in the vertical view along the vertical direction V. For this reason, the vehicle drive apparatus 100 tends to increase in size in the vertical direction V, as compared to when the inverter 19 is placed at other locations. In this regard, the present embodiment allows placement of the first pump portion 7A while suppressing an increase in the size of the vehicle drive apparatus 100 in the vertical direction V, and thus facilitates suppressing an increase in the size of the vehicle drive apparatus 100 in the vertical direction V even when the inverter 19 is placed in the manner described above.

As illustrated in FIG. 3, according to the present embodiment, the first pump portion 7A and the strainer 71 are placed on the lower side V2 with respect to the first axis A1 and the second axis A2, and is placed on the horizontal first side H1 with respect to the third axis A3 in the axial view. According to the present embodiment, the second pump portion 7B is also placed on the lower side V2 with respect to the first axis A1 and the second axis A2, and is placed on the horizontal first side H1 with respect to the third axis A3 in the axial view.

According to the present embodiment, the first pump portion 7A is placed such that the placement region of the first pump portion 7A in the vertical direction V overlaps the placement region of the differential gear mechanism 5 in the vertical direction V. Further, according to the present embodiment, the second pump portion 7B is placed such that a placement region of the second pump portion 7B in the vertical direction V overlaps the placement region of the differential gear mechanism 5 in the vertical direction V.

According to the present embodiment, the first pump portion 7A is placed such that the placement region of the first pump portion 7A in the horizontal direction H overlaps the placement region of the rotating electrical machine 1 in the horizontal direction H. Further, according to the present embodiment, the second pump portion 7B is placed such that the placement region of the second pump portion 7B in the horizontal direction H overlaps the placement region of the rotating electrical machine 1 in the horizontal direction H.

According to the present embodiment, the strainer 71 is placed such that a placement region of the strainer 71 in the vertical direction V overlaps the placement region of the differential gear mechanism 5 in the vertical direction V. Further, according to the present embodiment, the strainer 71 is placed such that the placement region of the strainer 71 in the horizontal direction H overlaps the placement region of the rotating electrical machine 1 in the horizontal direction H.

According to the present embodiment, at least part of the first pump portion 7A, at least part of the second pump portion 7B, and the strainer 71 are placed on the lower side V2 with respect to the third axis A3. Here, part of the first pump portion 7A and the whole of the second pump portion 7B are placed on the lower side V2 with respect to the third axis A3. Further, according to the present embodiment, at least part of the first pump portion 7A, at least part of the second pump portion 7B, and the strainer 71 are placed in the coolant reservoir portion 70. Here, part of the first pump portion 7A, part of the second pump portion 7B (specifically, the whole of a pump chamber of the second pump portion 7B and part of a pump cover of the second pump portion 7B) are placed in the coolant reservoir portion 70. The expression "placed in the coolant reservoir portion 70" means being placed on the lower side V2 with respect to the position of a fluid level (the position of a reference fluid level) in the coolant reservoir portion 70. The height of the fluid level (here, the oil level) in the coolant reservoir portion 70 fluctuates with the state of the vehicle drive apparatus 100. For example, the lowest position of the fluid level within the range of fluctuation of the height of the fluid level in the coolant reservoir portion 70 may be used as the position of the reference fluid level.

As illustrated in FIG. 3, according to the present embodiment, the second pump portion 7B is placed in such a manner as to overlap the differential input gear 51 in the axial view. Specifically, the second pump portion 7B is placed in such a manner as to overlap, in the axial view, a portion of the differential input gear 51 that is placed on the lower side V2 with respect to the third axis A3. As illustrated in FIG. 1, according to the present embodiment, the second pump portion 7B is placed on the axial second side L2 with respect to the differential input gear 51.

As illustrated in FIG. 3, according to the present embodiment, in the axial view, the strainer 71 is placed on the horizontal first side H1 with respect to the second pump portion 7B. The strainer 71 here is placed such that the placement region of the strainer 71 in the vertical direction V overlaps the placement region of the second pump portion 7B in the vertical direction V. In addition, the strainer 71 here is placed such that the placement region of the strainer 71 in the horizontal direction H overlaps the placement region of the input member 3 in the horizontal direction H.

As illustrated in FIG. 3, according to the present embodiment, the first pump portion 7A is placed on the upper side V1 with respect to the strainer 71, and is placed on the horizontal first side H1 with respect to the differential gear mechanism 5 in the axial view. The first pump portion 7A here is placed such that the placement region of the first pump portion 7A in the vertical direction V overlaps the placement region of the differential gear mechanism 5 in the vertical direction V. Further, the first pump portion 7A here is placed such that the placement region of the first pump portion 7A in the horizontal direction H overlaps the placement region of the strainer 71 in the horizontal direction H. Furthermore, the first pump portion 7A here is placed such that the placement region of the first pump portion 7A in the horizontal direction H overlaps the placement region of the input member 3 in the horizontal direction H.

As illustrated in FIG. 3, according to the present embodiment, at least part of the parking lock mechanism 90 to be locked with the parking gear 43 is placed on the horizontal first side H1 with respect to the counter gear mechanism 4 in the axial view. It is noted that as for the parking lock mechanism 90, FIG. 3 illustrates only the parking pawl 91 and roughly illustrates the placement region of the parking lock mechanism 90, without details of the parking lock mechanism 90, by a long dashed double-short dashed line. According to the present embodiment, part of the parking pawl 91 is placed in such a manner as to overlap the counter gear mechanism 4 (specifically, the first gear 41) in the axial view, and the remaining part of the parking pawl 91 and the swing mechanism of the parking lock mechanism 90, which is described above as swinging the parking pawl 91, are placed on the horizontal first side H1 with respect to the counter gear mechanism 4 in the axial view. Further, according to the present embodiment, in the axial view, the whole of the parking lock mechanism 90 is placed on the horizontal first side H1 with respect to the second axis A2. In addition, according to the present embodiment, at least part of the parking lock mechanism 90 is placed on the upper side V1 with respect to the first axis A1.

According to the present embodiment, the parking lock mechanism 90 is placed such that the placement region of the parking lock mechanism 90 in the vertical direction V overlaps the placement region of the counter gear mechanism 4 in the vertical direction V. Further, according to the present embodiment, the parking lock mechanism 90 is placed such that the placement region of the parking lock mechanism 90 in the horizontal direction H overlaps the placement region of the input member 3 in the horizontal direction H. Here, the parking lock mechanism 90 is placed such that the placement region of the parking lock mechanism 90 in the horizontal direction H overlaps the placement region of the first pump portion 7A in the horizontal direction H, and such that the placement region of the parking lock mechanism 90 in the horizontal direction H overlaps the placement region of the strainer 71 in the horizontal direction H. Further, according to the present embodiment, the parking lock mechanism 90 is placed in such a manner as to overlap the rotating electrical machine 1 in the axial view. It is noted that the parking lock mechanism 90 is placed on the axial first side L1 with respect to the rotating electrical machine 1.

OTHER EMBODIMENTS

Next, other embodiments of the vehicle drive apparatus are described.

Figure 5:
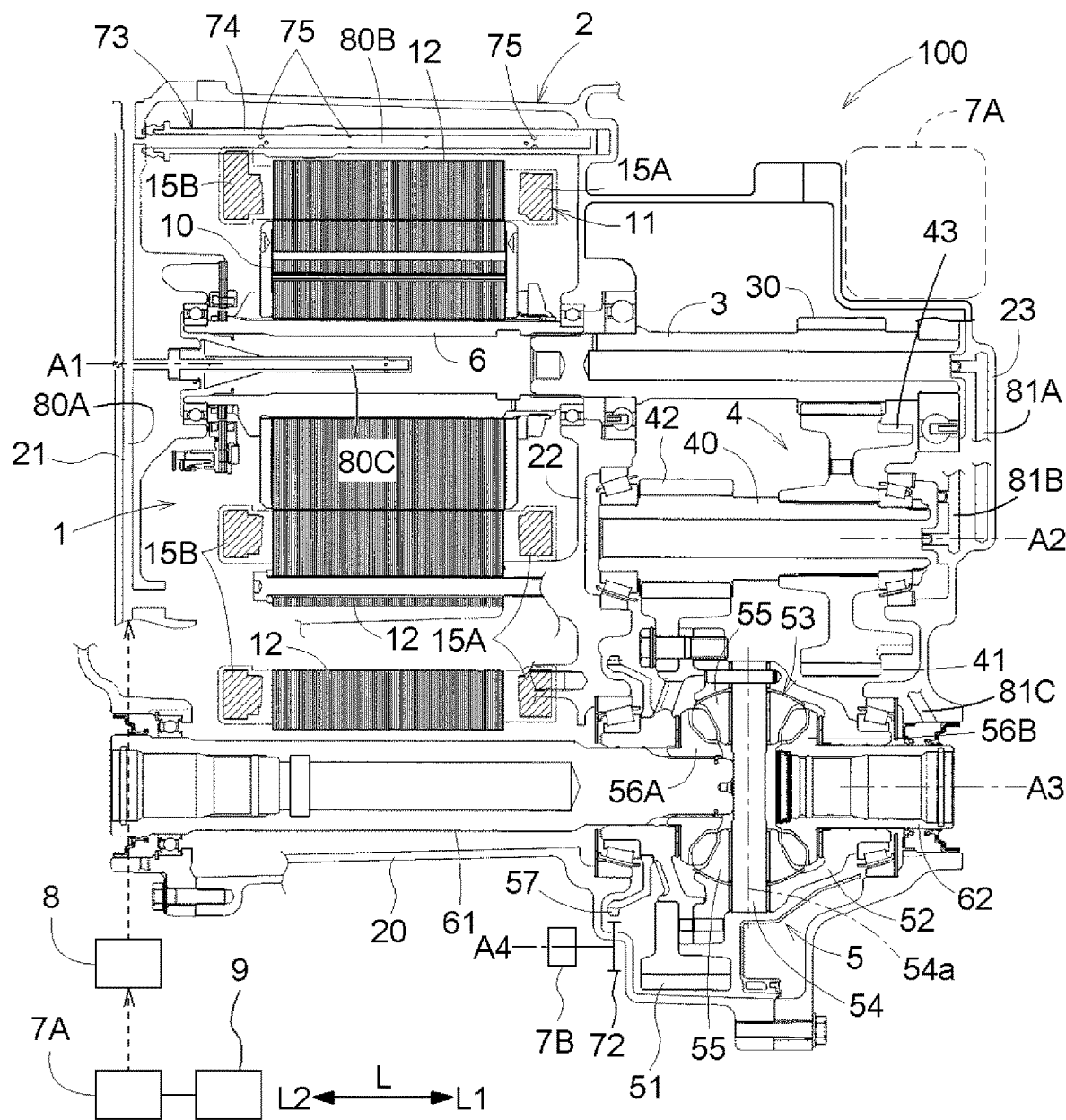
FIG. 5 is a cross-sectional view of a vehicle drive apparatus according to another embodiment.

(1) The above embodiment illustrates by example that the first pump portion 7A is placed inside the case 2. However, the present disclosure is not limited to such a structure, and the first pump portion 7A may be placed outside the case 2. One example of this structure is illustrated in FIG. 5 and FIG. 6. The example illustrated in FIG. 5 and FIG. 6 is structured essentially in the same manner as the above embodiment, except that the first pump portion 7A is placed outside the case 2 and except for the aspects described below. The example illustrated in FIG. 6 differs from the above embodiment in that in the axial view, the first pump portion 7A is placed on the horizontal first side H1 with respect to the strainer 71. Here, the first pump portion 7A is placed such that the placement region of the first pump portion 7A in the vertical direction V overlaps the placement region of the strainer 71 in the vertical direction V. Further, the example illustrated in FIG. 6 differs from the above embodiment in that the strainer 71 is placed at a location that overlaps the rotating electrical machine 1 in the axial view.

(2) The above embodiment illustrates by example that the second axis A2 is placed on the upper side V1 with respect to the imaginary plane B and that the first pump portion 7A is placed on the lower side V2 with respect to the imaginary plane B. However, the present disclosure is not limited to such a structure. The second axis A2 may be placed on the lower side V2 with respect to the imaginary plane B, and the first pump portion 7A may be placed on the upper side V1 with respect to the imaginary plane B.

(3) The above embodiment illustrates by example that at least part of the parking lock mechanism 90 is placed on the horizontal first side H1 with respect to the counter gear mechanism 4 in the axial view. However, the present disclosure is not limited to such a structure, and the parking lock mechanism 90 may have no portion that is placed on the horizontal first side H1 with respect to the counter gear mechanism 4 in the axial view. In this case, for example, at least part of the parking lock mechanism 90 may be placed on the upper side V1 with respect to the counter gear mechanism 4 in the axial view, or at least part of the parking lock mechanism 90 may be placed on the horizontal second side H2 with respect to the counter gear mechanism 4 in the axial view.

(4) The above embodiment illustrates by example that the parking gear 43 is provided in the counter gear mechanism 4. However, the present disclosure is not limited to such a structure, and the parking gear 43 may be provided to any other rotating member (e.g., the input member 3) than the counter gear mechanism 4.

(5) The above embodiment illustrates by example that the second pump portion 7B is placed in such a manner as to overlap the differential input gear 51 in the axial view. However, the present disclosure is not limited to such a structure, and the second pump portion 7B may be placed in such a manner as not to overlap the differential input gear 51 in the axial view.

(6) The above embodiment illustrates by example that the second pump portion 7B is driven by rotation of the differential case portion 52. However, the present disclosure is not limited to such a structure, and the second pump portion 7B may be driven by rotation of any other rotating member (e.g., the input member 3) than the differential case portion 52. Further, the above embodiment illustrates by example that a rotating member (in the above embodiment, the differential case portion 52) that drives the second pump portion 7B is coupled to the second pump portion 7B via a gear mechanism (in the above embodiment, a gear mechanism provided with the pump drive gear 57 and the pump input gear 72). However, the present disclosure is not limited to such a structure, and the rotating member that drives the second pump portion 7B may be coupled to the second pump portion 7B via a wrapping transfer mechanism (a mechanism using a chain and sprocket, a mechanism using a belt and pulley, etc.). Further, although the above embodiment illustrates by example that the second pump portion 7B and the rotating member that drives the second pump portion 7B are placed on different axes, the second pump portion 7B and the rotating member that drives the second pump portion 7B may be placed on the same axis as each other.

(7) The above embodiment illustrates by example that the vehicle drive apparatus 100 is provided with the second pump portion 7B. However, the present disclosure is not limited to such a structure, and the vehicle drive apparatus 100 may be provided with no second pump portion 7B.

(8) The above embodiment illustrates by example that the coolant supply portion 73 is provided with the supply pipe 74 placed in such a manner as to extend along the axial direction L and to face the stator 11 in the radial direction. However, the present disclosure is not limited to such a structure. For example, the coolant supply portion 73 may be provided with, instead of the supply pipe 74, a flow channel that is formed at the peripheral wall portion 20 in such a manner as to extend along the axial direction L, and the flow channel may have a supply hole that supplies the coolant toward the stator 11. Further, although the above embodiment illustrates by example that the coolant supply portion 73 supplies the stator 11 with oil as the coolant discharged from the first pump portion 7A, the coolant supply portion 73 may supply the stator 11 with, for example, cooling water as the coolant discharged from the first pump portion 7A. In this instance, the first pump portion 7A is a water pump that suctions cooling water as a coolant and discharges the cooling water into the case 2. In this instance, the coolant supply portion 73 is provided with, for example, a water channel (a water jacket) that is placed adjacent to and outside the outer circumferential surface of the stator core 12 in the radial direction (the radial direction with reference to the first axis A1), and drives the first pump portion 7A to circulate the cooling water through the water channel, thereby cooling the stator 11.

(9) The above embodiment illustrates by example that the center axis 54a of the pinion shaft 54 is placed on the axial first side L1 with respect to the differential input gear 51. However, the present disclosure is not limited to such a structure. The center axis 54a of the pinion shaft 54 may be placed at the same location as the differential input gear 51 in the axial direction L, or the center axis 54a of the pinion shaft 54 may be placed on the axial second side L2 with respect to the differential input gear 51.

(10) The above embodiment illustrates by example that the second gear 42 and the differential input gear 51 are placed on the axial second side L2 with respect to the first gear 41 and the input gear 30. However, the present disclosure is not limited to such a structure, and the second gear 42 and the differential input gear 51 may be placed on the axial first side L1 with respect to the first gear 41 and the input gear 30.

(11) The above embodiment illustrates by example that the placement region of the first pump portion 7A in the axial direction L overlaps the placement region of the counter gear mechanism 4 in the axial direction L. However, the present disclosure is not limited to such a structure, and the placement region of the first pump portion 7A in the axial direction L may not overlap the placement region of the counter gear mechanism 4 in the axial direction L.

(12) It is noted that the structure disclosed in any one of the embodiments described above may be used in combination with the structure disclosed in any other of the embodiments (including combinations of the embodiments described as other embodiments), as long as there is no contradiction therebetween. As for other structures, the embodiments disclosed in the present description are also to be considered in all aspects as illustrative only. Therefore, various modifications that fall within the spirit of the present disclosure are possible as appropriate.

SUMMARY OF THE EMBODIMENTS

Below is the summary of the vehicle drive apparatus described above.

A vehicle drive apparatus (100) is provided with: a rotating electrical machine (1) provided with a rotor (10) and a stator (11); an input member (3) drivingly coupled to the rotor (10); a counter gear mechanism (4); a differential gear mechanism (5) that distributes, to a first wheel (W1) and a second wheel (W2), a driving force transmitted thereto from the rotating electrical machine (1) via the input member (3) and the counter gear mechanism (4); a case (2) that houses the rotating electrical machine (1), the input member (3), the counter gear mechanism (4), and the differential gear mechanism (5), and a pump portion (7A) that suctions a coolant and discharges the coolant into the case (2). The rotating electrical machine (1) and the input member (3) are placed on a first axis (A1). The counter gear mechanism (4) is placed on a second axis (A2) different from the first axis (A1). The differential gear mechanism (5) is placed on a third axis (A3) different from the first axis (A1) and the second axis (A2). The input member (3), the counter gear mechanism (4), and the differential gear mechanism (5) have portions that are placed on an axial first side (L1) with respect to the rotating electrical machine (1). The axial first side (L1) is one side in an axial direction (L). A side opposite the axial first side (L1) in the axial direction (L) is defined as an axial second side (L2). The differential gear mechanism (5) is coupled to the first wheel (W1) via a shaft member (61) that is on the third axis (A3) and that has a portion placed on the axial second side (L2) with respect to the differential gear mechanism (5). The pump portion (7A) is placed on the opposite side of an imaginary plane (B) passing through the first axis (A1) and the third axis (A3) from the second axis (A2), and is placed at a location that overlaps at least one of the rotating electrical machine (1) and the differential gear mechanism (5) in an axial view that is along the axial direction (L). The pump portion (7A) is placed on the axial first side (L1) with respect to the rotating electrical machine (1).

According this structure, the input member (3), the counter gear mechanism (4), and the differential gear mechanism (5) have the respective portions that are placed on the axial first side (L1) with respect to the rotating electrical machine (1), and thus a force transmission mechanism that transmits the driving force between the input member (3) and the differential gear mechanism (5) via the counter gear mechanism (4) is placeable in a space on the axial first side (L1) with respect to the rotating electrical machine (1). Placing the force transmission mechanism in this way facilitates placing the differential gear mechanism (5) toward the axial first side (L1). The differential gear mechanism (5) is typically formed to be relatively large in diameter. Therefore, placing the differential gear mechanism (5) toward the axial first side (L1) facilitates placing the first axis (A1), on which the rotating electrical machine (1) is placed, and the third axis (A3), on which the differential gear mechanism (5) is placed, close to each other (i.e., reducing an inter-axis distance between the first axis (A1) and the third axis (A3)), while avoiding interference between the rotating electrical machine (1) and the differential gear mechanism (5). Further, reducing the inter-axis distance between the first axis (A1) and the third axis (A3) allows a reduction in the size of the vehicle drive apparatus (100) in the axial view.

Further, according to the present structure, the pump portion (7A) is placed on the opposite side of the imaginary plane (B), passing through the first axis (A1) and the third axis (A3), from the second axis (A2) and is placed at a location that overlaps at least one of the rotating electrical machine (1) and the differential gear mechanism (5) in the axial view. The rotating electrical machine (1) and the differential gear mechanism (5) both tend to be large in size in the radial direction. Therefore, placing the pump portion (7A) at the location that overlaps at least one of the rotating electrical machine (1) and the differential gear mechanism (5) in the axial view in this way allows placement of the pump portion (7A) while suppressing an increase in the size of the vehicle drive apparatus (100) in the axial view. Further, since the pump portion (7A) is placed on the opposite side of the imaginary plane (B) from the second axis (A2), the pump portion (7A) is placeable in such a manner as to have a high degree of overlap with at least one of the rotating electrical machine (1) and the differential gear mechanism (5) while avoiding interference with the counter gear mechanism (4) placed on the second axis (A2). In addition, according to the present structure, the pump portion (7A) is placed on the axial first side (L1) with respect to the rotating electrical machine (1). As described above, according to the vehicle drive apparatus (100) of the present disclosure, the force transmission mechanism that transmits the driving force between the input member (3) and the differential gear mechanism (5) is placeable in the space on the axial first side (L1) with respect to the axial first side (L1). Thus, placing the pump portion (7A) on the axial first side (L1) with respect to the rotating electrical machine (1) allows the placement region of the pump portion (7A) in the axial direction (L) to overlap the placement region of the force transmission mechanism in the axial direction (L). Therefore, it is possible to place the pump portion (7A) while suppressing an increase in the size of the vehicle drive apparatus (100) in the axial direction (L).

Preferably, the placement region of the pump portion (7A) in the axial direction (L) may overlap the placement region of the counter gear mechanism (4) in the axial direction (L).

This structure causes the placement region of the pump portion (7A) in the axial direction (L) to overlap the placement region of the counter gear mechanism (4) included in the force transmission mechanism in the axial direction (L), thus allowing placement of the pump portion (7A) while suppressing an increase in the size of the vehicle drive apparatus (100) in the axial direction (L).

Further, the coolant discharged by the pump portion (7A) may be preferably supplied to the rotating electrical machine (1).

This structure allows the coolant discharged by the pump portion (7A) placed in the manner described above to actively cool the rotating electrical machine (1), thus facilitating providing adequate cooling performance for the rotating electrical machine (1).

When the vehicle drive apparatus (100) is structured such that the coolant discharged by the pump portion (7A) is supplied to the rotating electrical machine (1), it may be preferable that the vehicle drive apparatus (100) be provided with a coolant supply portion (73) that supplies the stator (11) with the coolant discharged by the pump portion (7A), that the coolant supply portion (73) be provided with a supply pipe (74) that is placed in such a manner as to extend along the axial direction (L) and to face the stator (11) in a radial direction, and that the supply pipe (74) have a flow channel (80B) formed therein to cause the coolant to flow therethrough and be provided with a supply hole (75) that supplies the coolant toward the stator (11).

This structures supplies, from the supply hole (75) to the stator (11), the coolant flowing through the flow channel (80B) formed in the supply pipe (74), thus being capable of cooling the stator (11). Further, by providing the supply pipe (74) at a different location from the shaft member (61) in the circumferential direction (the circumferential direction with reference to the first axis (A1)), it is possible to place the first axis (A1) and the third axis (A3) close to each other while avoiding interference between the supply pipe (74) and the shaft member (61).

When the vehicle drive apparatus (100) is structured in any of the manners described above, the second axis (A2) may be preferably placed on an upper side (V1) with respect to the first axis (A1) and the third axis (A3).

This structures displaces the second axis (A2) toward the upper side (V1) when placing the first axis (A1) and the third axis (A3) close to each other, thus allowing the input member (3) and the differential gear mechanism (5) to be drivingly coupled to each other appropriately via the counter gear mechanism (4) while reducing the inter-axis distance between the first axis (A1) and the third axis (A3).

Further, for example, when a coolant reservoir portion (70) that stores the coolant is formed at a lower portion of the case (2) and when the pump portion (7A) suctions the coolant stored in the coolant reservoir portion (70), it may be preferable that the pump portion (7A) be placed near the coolant reservoir portion (70) so as to reduce the suction resistance of the coolant. In this regard, the present structure allows the opposite side of the imaginary plane (B) from the second axis (A2) to be the lower side (V2) with respect to the imaginary plane (B), thus facilitating placing the pump portion (7A) near the coolant reservoir portion (70). Unlike the structure of the present disclosure, if the second axis (A2) is placed on the same side of the imaginary plane (B) as the pump portion (7A), the first axis (A1) on which the rotating electrical machine (1) is placed may need to be moved to the upper side (V1) in order to avoid interference of the counter gear mechanism (4) with the pump portion (7A) or components associated therewith (e.g., the strainer (71)), and this may increase the size of the vehicle drive apparatus (100) in the vertical direction (V). In contrast, the present structure is capable of relatively easily avoiding such interference and thus allows a reduction in the size of the vehicle drive apparatus (100) in the vertical direction (V).

Further, the first axis (A1) may be preferably placed on the upper side (V1) with respect to the third axis (A3).

According to this structure, a relatively large vacant space that overlaps the rotating electrical machine (1) in the axial view is formable on the lower side (V2) with respect to the rotating members placed on the first axis (A1), such as the input member (3). Placing the pump portion (7A) by using this vacant space allows placement of the pump portion (7A) while suppressing an increase in the size of the vehicle drive apparatus (100) in the vertical direction (V). For this reason, the present structure is particularly suitable for when the pump portion (7A) is placed on the lower side (V2) with respect to the imaginary plane (B) and is placed at a location that overlaps at least the rotating electrical machine (1), of the rotating electrical machine (1) and the differential gear mechanism (5), in the axial view.

Further, it may be preferable that the vehicle drive apparatus (100) be provided with an inverter (19) that drives the rotating electrical machine (1), and that the inverter (19) be placed on the upper side (V1) with respect to the rotating electrical machine (1) in such a manner as to overlap the rotating electrical machine (1) in the vertical view that is along the vertical direction (V).

According to the vehicle drive apparatus (100) of the present disclosure, since the pump portion (7A) is placed on the opposite side of the imaginary plane (B) from the second axis (A2), on which the counter gear mechanism (4) is placed, interference between the counter gear mechanism (4) and the pump portion (7A) is relatively easily avoidable. This facilitates avoiding the likelihood that the size of the vehicle drive apparatus (100) in the vertical direction (V) is increased by moving the first axis (A1), on which the rotating electrical machine (1) is placed, toward the upper side (V1) in order to avoid the interference. Therefore, although the inverter (19) is placed in the present structure, an increase in the size of the vehicle drive apparatus (100) in the vertical direction (V) tends to be suppressed.

Further, it may be preferable that the vehicle drive apparatus (100) be provided with a strainer (71) that filters the coolant to be suctioned by the pump portion (7A), and that the strainer (71) be placed on the same side of the imaginary plane (B) as the pump portion (7A) and be placed at a location that overlaps neither the rotating electrical machine (1) nor the differential gear mechanism (5) in the axial view.

This structure facilitates placing the counter gear mechanism (4) in such a manner as to avoid not only interference with the pump portion (7A), but also interference with the strainer (71). Further, as compared to when the pump portion (7A) and the strainer (71) are placed on the opposite side of the imaginary plane (B) from each other, the pump portion (7A) and the strainer (71), which are connected together to allow flow of a coolant therebetween, are placeable close to each other, and thus it is easy to reduce the suction resistance of the coolant.

When the strainer (71) is placed in the manner described above, it may be preferable that in the axial view, a side on which the first axis (A1) is placed with respect to the third axis (A3) in a horizontal direction (H) be defined as a horizontal first side (H1), and that the pump portion (7A) and the strainer (71) be placed on the lower side (V2) with respect to the first axis (A1) and the second axis (A2), and be placed on the horizontal first side (H1) with respect to the third axis (A3) in the axial view.

According to this structure, the pump portion (7A) and the strainer (71) are placed on the lower side (V2) with respect to the first axis (A1) and the second axis (A2), so that a space for placement of the pump portion (7A) and the strainer (71) is easily providable near a lower portion of the case (2). For this reason, the present structure is particularly suitable for when the coolant reservoir portion (70) is formed at the lower portion of the case (2).

Further, according to this structure, the pump portion (7A) and the strainer (71) are placed on the horizontal first side (H1) with respect to the third axis (A3) in the axial view. It is noted here that the horizontal first side (H1) is a side on which the first axis (A1) is placed with respect to the third axis (A3) in the horizontal direction (H). Thus, according to the present structure, the pump portion (7A) and the strainer (71) are placeable such that the placement regions of the pump portion (7A) and the strainer (71) in the vertical direction (V) overlap the placement region of the differential gear mechanism (5), placed on the third axis (A3), in the vertical direction (V) and such that the placement regions of the pump portion (7A) and the strainer (71) in the horizontal direction (H) overlap the placement region of the rotating electrical machine (1), placed on the first axis (A1), in the horizontal direction (H). Therefore, it is possible to place the pump portion (7A) and the strainer (71) while suppressing an increase in the size of the vehicle drive apparatus (100) in both the vertical direction (V) and the horizontal direction (H).

When the pump portion (7A) and the strainer (71) are placed in the manner described above, it may be preferable that the pump portion (7A) be defined as a first pump portion (7A), that the vehicle drive apparatus (100) be provided with a second pump portion (7B) that suctions the coolant and discharges the coolant into the case (2), that the differential gear mechanism (5) be provided with a gear group (53), a differential case portion (52) that encloses the gear group (53), and a differential input gear (51) that meshes with a gear (42) provided in the counter gear mechanism (4) and that rotates as a unit with the differential case portion (52), that the first pump portion (7A) be driven by a dedicated driving-force source (9) independent of a force transmission path that connects the rotating electrical machine (1) to the first wheel (W1) and the second wheel (W2), that the second pump portion (7B) be driven by rotation of the differential case portion (52), that the second pump portion (7B) be placed in such a manner as to overlap the differential input gear (51) in the axial view, that the strainer (71) be placed on the horizontal first side (H1) with respect to the second pump portion (7B) in the axial view, and that the first pump portion (7A) be placed on the upper side (V1) with respect to the strainer (71) and be placed on the horizontal first side (H1) with respect to the differential gear mechanism (5) in the axial view.

According to this structure, the second pump portion (7B) is placed in such a manner as to overlap the differential input gear (51) in the axial view. Thus, it is possible to place the second pump portion (7B) while suppressing an increase in the size of the vehicle drive apparatus (100) in the axial view. Further, according to the present structure, the strainer (71) is placed on the horizontal first side (H1) with respect to the second pump portion (7B) in the axial view. Thus, it is possible to place the strainer (71) such that the placement region of the strainer (71) in the vertical direction (V) overlaps the placement region of the second pump portion (7B) in the vertical direction (V). Therefore, it is possible to place the strainer (71) while suppressing an increase in the size of the vehicle drive apparatus (100) in the vertical direction (V). In addition, according to this structure, the first pump portion (7A) is placed on the upper side (V1) with respect to the strainer (71) and is placed on the horizontal first side (H1) with respect to the differential gear mechanism (5) in the axial view. Thus, it is possible to place the first pump portion (7A) such that the placement region of the first pump portion (7A) in the vertical direction (V) overlaps the placement region of the differential gear mechanism (5) in the vertical direction (V) and such that the placement region of the first pump portion (7A) in the horizontal direction (H) overlaps the placement region of the strainer (71) in the horizontal direction (H). Therefore, it is possible to place the first pump portion (7A) while suppressing an increase in the size of the vehicle drive apparatus (100) in both the vertical direction (V) and the horizontal direction (H).

When the vehicle drive apparatus (100) is structured in the above manners, it may be preferable that the counter gear mechanism (4) be provided with a parking gear (43), that in the axial view, the first axis (A1), the second axis (A2), and the third axis (A3) be placed in this order from one side to the other side in the horizontal direction (H), that in the axial view, a side on which the first axis (A1) is placed with respect to the third axis (A3) in the horizontal direction (H) be defined as a horizontal first side (H1), and that in the axial view, at least part of a parking lock mechanism (90) that is configured to be locked with the parking gear (43) be placed on the horizontal first side (H1) with respect to the counter gear mechanism (4).

According to this structure, at least part of the parking lock mechanism (90) is placed on the horizontal first side (H1) with respect to the counter gear mechanism (4) in the axial view, and thus it is possible to place the parking lock mechanism (90) such that the placement region of the parking lock mechanism (90) in the vertical direction (V) overlaps the placement region of the counter gear mechanism (4) in the vertical direction (V). Therefore, it is possible to place the parking lock mechanism (90) while suppressing an increase in the size of the vehicle drive apparatus (100) in the vertical direction (V).

Further, according to the present structure, the first axis (A1), the second axis (A2), and the third axis (A3) are placed in this order from the horizontal first side (H1) to a horizontal second side (H2) that is opposite the horizontal first side (H1) in the horizontal direction (H). Thus, since at least part of the parking lock mechanism (90) is placed on the horizontal first side (H1) with respect to the counter gear mechanism (4) in the axial view, interference between the parking lock mechanism (90) and the differential gear mechanism (5) placed on the third axis (A3) tends to be avoided. This allows the placement region of the parking lock mechanism (90) in the vertical direction (V) to have a high degree of overlap with the placement region of the counter gear mechanism (4) in the vertical direction (V) so that an increase in the size of the vehicle drive apparatus (100) in the vertical direction (V) tends to be suppressed.

Further, the pump portion (7A) may be preferably placed inside the case (2).

This structure is capable of simplifying a sealing structure for forming a coolant flow channel that connects the pump portion (7A) and the interior of the case (2) together, and is in turn capable of simplifying the coolant flow channel, as compared to when the pump portion (7A) is placed outside the case (2). Accordingly, the pump portion (7A) and the case (2) are capable of being simplified in structure to facilitate a reduction in the size of the vehicle drive apparatus (100).

Further, it may be preferable that an imaginary line segment connecting the first axis (A1) and the second axis (A2) in the axial view be defined as a first line segment (B1), that an imaginary line segment connecting the second axis (A2) and the third axis (A3) in the axial view be defined as a second line segment (B2), and that an angle (C1) formed by the first line segment (B1) and the second line segment (B2) be acute.

The inter-axis distance between the second axis (A2) and the first axis (A1) (hereinafter referred to as the "first inter-axis distance") and the inter-axis distance between the second axis (A2) and the third axis (A3) (hereinafter referred to as the "second inter-axis distance") need to be maintained to the extent that the counter gear mechanism (4) is placeable appropriately while avoiding interference with other rotating members. In this regard, according to the present structure, the angle (C1) formed by the first line segment (B1) and the second line segment (B2) is acute, and therefore, even when the first axis (A1) and the third axis (A3) are placed close to each other, it is easy to maintain the first inter-axis distance and the second inter-axis distance adequately, as compared to when this angle (C1) is a right angle or an obtuse angle. Thus, the present structure facilitates reducing the inter-axis distance between the first axis (A1) and the third axis (A3), as compared to when the angle (C1) formed by the first line segment (B1) and the second line segment (B2) is a right angle or an obtuse angle.

When the angle (C1) formed by the first line segment (B1) and the second line segment (B2) is acute as described above, it may be preferable that an imaginary line segment connecting the first axis (A1) and the third axis (A3) in the axial view be defined as a third line segment (B3), and that the angle (C1) formed by the first line segment (B1) and the second line segment (B2) be greater than an angle (C2) formed by the first line segment (B1) and the third line segment (B3) and be greater than an angle (C3) formed by the second line segment (B2) and the third line segment (B3).

This structure causes the angle (C1) formed by the first line segment (B1) and the second line segment (B2) to be a relatively large acute angle, thereby avoiding the likelihood of the first inter-axis distance and the second inter-axis distance becoming too long. Thus, an increase in the size of the vehicle drive apparatus (100) in the vertical direction (V) that is caused by placement of the second axis (A2) on the upper side (V1) with respect to the first axis (A1) and the third axis (A3) tends to be suppressed.

Further, the gear group (53) that structures the differential gear mechanism (5) may be preferably placed on the axial first side (L1) with respect to the stator (11).

This structure allows the gear group (53) that is typically formed to be relatively large in diameter, to be placed at a different location from the stator (11) in the axial direction (L). Thus, it becomes easier to place the first axis (A1) and the third axis (A3) close to each other while avoiding interference between the rotating electrical machine (1) and the differential gear mechanism (5).

Further, it may be preferable that the counter gear mechanism (4) be provided with a first gear (41) that meshes with an input gear (30) that rotates as a unit with the input member (3), and a second gear (42) that meshes with a differential input gear (51) provided in the differential gear mechanism (5), and that the second gear (42) and the differential input gear (51) be placed on the axial second side (L2) with respect to the first gear (41) and the input gear (30).

According to this structure, the differential gear mechanism (5) is placeable toward the axial second side (L2) to the extent, for example, that the gear group (53) structuring the differential gear mechanism (5) is placed on the axial first side (L1) with respect to the stator (11), as compared to when the second gear (42) and the differential input gear (51) are placed on the axial first side (L1) with respect to the first gear (41) and the input gear (30). Thus, it is easy for an end portion of the vehicle drive apparatus (100) on the axial first side (L1) along the third axis (A3) to have a shape with a smaller amount of protrusion toward the axial first side (L1) so that it is easy for the vehicle drive apparatus (100) to have a shape that provides good mountability on a vehicle.

When the second gear (42) and the differential input gear (51) are placed on the axial second side (L2) with respect to the first gear (41) and the input gear (30) as described above, it may be preferable that the differential gear mechanism (5) be provided with a pinion shaft (54) that extends along a direction perpendicular to the axial direction (L), and that the center axis (54a) of the pinion shaft (54) be placed on the axial first side (L1) with respect to the differential input gear (51).

This structure allows the second gear (42) and the differential input gear (51) to be placed toward the axial second side (L2), as compared to when the center axis (54a) of the pinion shaft (54) is placed on the axial second side (L2) with respect to the differential input gear (51), and accordingly allows the first gear (41) and the input gear (30) to be placed toward the axial second side (L2). Thus, it is possible to reduce the size of the vehicle drive apparatus (100) in the axial direction (L).

Achieving at least one of the effects described above meets the requirements of a vehicle drive apparatus according to the present disclosure.

DESCRIPTION OF THE REFERENCE NUMERALS

1: rotating electrical machine, 2: case, 3: input member, 4: counter gear mechanism, 5: differential gear mechanism, 7a: first pump portion (pump portion), 7b: second pump portion, 9: electric motor (dedicated driving-force source), 10: rotor, 11: stator, 19: inverter, 30: input gear, 41: first gear, 42: second gear (gear provided in counter gear mechanism), 43: parking gear, 51: differential input gear, 52: differential case portion, 53: gear group, 54: pinion shaft, 54a: center axis, 61: first output member (shaft member), 71: strainer, 73: coolant supply portion, 74: supply pipe, 75: supply hole, 80b: second cooling flow channel (flow channel), 90: parking lock mechanism, 100: vehicle drive apparatus, a1: first axis, A2: second axis, A3: third axis, B: imaginary plane, B1: first line segment, B2: second line segment, B3: third line segment, C1: first angle (angle formed by first line segment and second line segment), C2: second angle (angle formed by first line segment and third line segment), C3: third angle (angle formed by second line segment and third line segment), H: horizontal direction, H1: horizontal first side, L: axial direction, L1: axial first side, L2: axial second side, V1: upper side, V2: lower side, W1: first wheel, W2: second wheel.

The invention claimed is:
1. A vehicle drive apparatus comprising:
a rotating electrical machine provided with a rotor and a stator;
an input member drivingly coupled to the rotor;
a counter gear mechanism;
a differential gear mechanism that distributes, to a first wheel and a second wheel, a driving force transmitted thereto from the rotating electrical machine via the input member and the counter gear mechanism;
a case that houses the rotating electrical machine, the input member, the counter gear mechanism, and the differential gear mechanism;
a pump portion that suctions a coolant and discharges the coolant into the case;

a parking gear that is provided in the counter gear mechanism or the input member; and
a parking lock mechanism that is configured to be locked with the parking gear, wherein
the rotating electrical machine and the input member are placed on a first axis,
the counter gear mechanism is placed on a second axis different from the first axis,
the differential gear mechanism is placed on a third axis different from the first axis and the second axis,
the input member, the counter gear mechanism, and the differential gear mechanism have portions that are placed on an axial first side with respect to the rotating electrical machine, the axial first side being one side in an axial direction,
a side opposite the axial first side in the axial direction is defined as an axial second side,
the differential gear mechanism is coupled to the first wheel via a shaft member on the third axis, the shaft member having a portion placed on the axial second side with respect to the differential gear mechanism,
the pump portion is placed on an opposite side of an imaginary plane from the second axis and at a location that overlaps at least one of the rotating electrical machine and the differential gear mechanism in an axial view that is along the axial direction, the imaginary plane passing through the first axis and the third axis,
the pump portion is placed on the axial first side with respect to the rotating electrical machine, and
the parking lock mechanism is placed on a same side of the imaginary plane as the second axis and is placed at a location that overlaps the rotating electrical machine in the axial view.

2. The vehicle drive apparatus according to claim 1, wherein a placement region of the pump portion in the axial direction overlaps a placement region of the counter gear mechanism in the axial direction.

3. The vehicle drive apparatus according to claim 1, wherein the coolant discharged by the pump portion is supplied to the rotating electrical machine.

4. The vehicle drive apparatus according to claim 3, further comprising a coolant supply portion that supplies the stator with the coolant discharged by the pump portion, wherein
the coolant supply portion is provided with a supply pipe that is placed in such a manner as to extend along the axial direction and to face the stator in a radial direction, and
the supply pipe has a flow channel formed therein to cause the coolant to flow therethrough and is provided with a supply hole that supplies the coolant toward the stator.

5. The vehicle drive apparatus according to claim 1, wherein the second axis is placed on an upper side with respect to the first axis and the third axis.

6. The vehicle drive apparatus according to claim 1, wherein the first axis is placed on an upper side with respect to the third axis.

7. The vehicle drive apparatus according to claim 1, further comprising an inverter that drives the rotating electrical machine, wherein
the inverter is placed on an upper side with respect to the rotating electrical machine in such a manner as to overlap the rotating electrical machine in a vertical view that is along a vertical direction.

8. The vehicle drive apparatus according to claim 1, further comprising a strainer that filters the coolant to be suctioned by the pump portion, wherein the strainer is placed on a same side of the imaginary plane as the pump portion and is placed at a location that overlaps neither the rotating electrical machine nor the differential gear mechanism in the axial view.

9. The vehicle drive apparatus according to claim 8, wherein
in the axial view, a side on which the first axis is placed with respect to the third axis in a horizontal direction is defined as a horizontal first side, and
the pump portion and the strainer are placed on a lower side with respect to the first axis and the second axis, and are placed on the horizontal first side with respect to the third axis in the axial view.

10. The vehicle drive apparatus according to claim 9, wherein
the pump portion is defined as a first pump portion, and the vehicle drive apparatus further includes a second pump portion that suctions the coolant and discharges the coolant into the case,
the counter gear mechanism is provided with a gear group, a differential case portion that encloses the gear group, and a differential input gear that meshes with a gear provided in the counter gear mechanism and that rotates as a unit with the differential case portion,
the first pump portion is driven by a dedicated driving-force source independent of a force transmission path that connects the rotating electrical machine to the first wheel and the second wheel,
the second pump portion is driven by rotation of the differential case portion,
the second pump portion is placed in such a manner as to overlap the differential input gear in the axial view,
the strainer is placed on the horizontal first side with respect to the second pump portion in the axial view, and
the first pump portion is placed on an upper side with respect to the strainer and on the horizontal first side with respect to the differential gear mechanism in the axial view.

11. The vehicle drive apparatus according to claim 1, wherein
the counter gear mechanism is provided with the parking gear,
in the axial view, the first axis, the second axis, and the third axis are placed in this order from one side to another side in a horizontal direction,
in the axial view, a side on which the first axis is placed with respect to the third axis in the horizontal direction is defined as a horizontal first side, and
in the axial view, at least part of the parking lock mechanism that is configured to be locked with the parking gear is placed on the horizontal first side with respect to the counter gear mechanism.

12. The vehicle drive apparatus according to claim 1, wherein
the pump portion is placed inside the case.

13. The vehicle drive apparatus according to claim 1, wherein
an imaginary line segment connecting the first axis and the second axis in the axial view is defined as a first line segment and an imaginary line segment connecting the second axis and the third axis in the axial view is defined as a second line segment, and
an angle formed by the first line segment and the second line segment is acute.

14. The vehicle drive apparatus according to claim 13, wherein an imaginary line segment connecting the first axis and the third axis in the axial view is defined as a third line segment, and
the angle formed by the first line segment and the second line segment is greater than an angle formed by the first line segment and the third line segment, and is greater than an angle formed by the second line segment and the third line segment.

15. The vehicle drive apparatus according to claim 1, wherein
a gear group that structures the differential gear mechanism is placed on the axial first side with respect to the stator.

16. The vehicle drive apparatus according to claim 1, wherein
the counter gear mechanism is provided with a first gear that meshes with an input gear that rotates as a unit with the input member, and a second gear that meshes with a differential input gear that is provided in the differential gear mechanism, and
the second gear and the differential input gear are placed on the axial second side with respect to the first gear and the input gear.

17. The vehicle drive apparatus according to claim 16, wherein
the differential gear mechanism is provided with a pinion shaft that extends along a direction perpendicular to the axial direction, and
a center axis of the pinion shaft is placed on the axial first side with respect to the differential input gear.

18. A vehicle drive apparatus comprising:
a rotating electrical machine provided with a rotor and a stator;
an input member drivingly coupled to the rotor;
a counter gear mechanism;
a differential gear mechanism that distributes, to a first wheel and a second wheel, a driving force transmitted thereto from the rotating electrical machine via the input member and the counter gear mechanism;
a case that houses the rotating electrical machine, the input member, the counter gear mechanism, and the differential gear mechanism; and
a pump portion that suctions a coolant and discharges the coolant into the case, wherein
the rotating electrical machine and the input member are placed on a first axis,
the counter gear mechanism is placed on a second axis different from the first axis,
the differential gear mechanism is placed on a third axis different from the first axis and the second axis,
the input member, the counter gear mechanism, and the differential gear mechanism have portions that are placed on an axial first side with respect to the rotating electrical machine, the axial first side being one side in an axial direction,
a side opposite the axial first side in the axial direction is defined as an axial second side,
the differential gear mechanism is coupled to the first wheel via a shaft member on the third axis, the shaft member having a portion placed on the axial second side with respect to the differential gear mechanism,
the pump portion is placed on an opposite side of an imaginary plane from the second axis and at a location that overlaps at least one of the rotating electrical machine and the differential gear mechanism in an axial view that is along the axial direction, the imaginary plane passing through the first axis and the third axis,
the pump portion is placed on the axial first side with respect to the rotating electrical machine, and
the coolant discharged by the pump portion is supplied to the rotating electrical machine.

19. A vehicle drive apparatus comprising:
a rotating electrical machine provided with a rotor and a stator;
an inverter that drives the rotating electrical machine;
an input member drivingly coupled to the rotor;
a counter gear mechanism;
a differential gear mechanism that distributes, to a first wheel and a second wheel, a driving force transmitted thereto from the rotating electrical machine via the input member and the counter gear mechanism;
a case that houses the rotating electrical machine, the input member, the counter gear mechanism, and the differential gear mechanism; and
a pump portion that suctions a coolant and discharges the coolant into the case, wherein
the rotating electrical machine and the input member are placed on a first axis,
the counter gear mechanism is placed on a second axis different from the first axis,
the differential gear mechanism is placed on a third axis different from the first axis and the second axis,
the input member, the counter gear mechanism, and the differential gear mechanism have portions that are placed on an axial first side with respect to the rotating electrical machine, the axial first side being one side in an axial direction,
a side opposite the axial first side in the axial direction is defined as an axial second side,
the differential gear mechanism is coupled to the first wheel via a shaft member on the third axis, the shaft member having a portion placed on the axial second side with respect to the differential gear mechanism,
the pump portion is placed on an opposite side of an imaginary plane from the second axis and at a location that overlaps at least one of the rotating electrical machine and the differential gear mechanism in an axial view that is along the axial direction, the imaginary plane passing through the first axis and the third axis,
the pump portion is placed on the axial first side with respect to the rotating electrical machine, and
the inverter is placed on an upper side with respect to the rotating electrical machine in such a manner as to overlap the rotating electrical machine in a vertical view that is along a vertical direction.

20. A vehicle drive apparatus comprising:
a rotating electrical machine provided with a rotor and a stator;
an input member drivingly coupled to the rotor;
a counter gear mechanism;
a differential gear mechanism that distributes, to a first wheel and a second wheel, a driving force transmitted thereto from the rotating electrical machine via the input member and the counter gear mechanism;
a case that houses the rotating electrical machine, the input member, the counter gear mechanism, and the differential gear mechanism;
a pump portion that suctions a coolant and discharges the coolant into the case; and
a strainer that filters the coolant to be suctioned by the pump portion, wherein
the rotating electrical machine and the input member are placed on a first axis, the counter gear mechanism is placed on a second axis different from the first axis, the differential gear mechanism is placed on a third axis different from the first axis and the second axis, the input member, the counter gear mechanism, and the differential gear mechanism have portions that are placed on an axial first side with respect to the rotating electrical machine, the axial first side being one side in an axial direction, a side opposite the axial first side in the axial direction is defined as an axial second side, the differential gear mechanism is coupled to the first wheel via a shaft member on the third axis, the shaft member having a portion placed on the axial second side with respect to the differential gear mechanism, the pump portion is placed on an opposite side of an imaginary plane from the second axis and at a location that overlaps at least one of the rotating electrical machine and the differential gear mechanism in an axial view that is along the axial direction, the imaginary plane passing through the first axis and the third axis, the pump portion is placed on the axial first side with respect to the rotating electrical machine, and the strainer is placed on a same side of the imaginary plane as the pump portion and is placed at a location that overlaps neither the rotating electrical machine nor the differential gear mechanism in the axial view.

21. A vehicle drive apparatus comprising:
a rotating electrical machine provided with a rotor and a stator;
an input member drivingly coupled to the rotor;
a counter gear mechanism;
a differential gear mechanism that distributes, to a first wheel and a second wheel, a driving force transmitted thereto from the rotating electrical machine via the input member and the counter gear mechanism;
a case that houses the rotating electrical machine, the input member, the counter gear mechanism, and the differential gear mechanism; and
a pump portion that suctions a coolant and discharges the coolant into the case, wherein
the rotating electrical machine and the input member are placed on a first axis,
the counter gear mechanism is placed on a second axis different from the first axis,
the differential gear mechanism is placed on a third axis different from the first axis and the second axis,
the input member, the counter gear mechanism, and the differential gear mechanism have portions that are placed on an axial first side with respect to the rotating electrical machine, the axial first side being one side in an axial direction,
a side opposite the axial first side in the axial direction is defined as an axial second side,
the differential gear mechanism is coupled to the first wheel via a shaft member on the third axis, the shaft member having a portion placed on the axial second side with respect to the differential gear mechanism,
the pump portion is placed on an opposite side of an imaginary plane from the second axis and at a location that overlaps at least one of the rotating electrical machine and the differential gear mechanism in an axial view that is along the axial direction, the imaginary plane passing through the first axis and the third axis,
the pump portion is placed on the axial first side with respect to the rotating electrical machine,
an imaginary line segment connecting the first axis and the second axis in the axial view is defined as a first line segment and an imaginary line segment connecting the second axis and the third axis in the axial view is defined as a second line segment, and
an angle formed by the first line segment and the second line segment is acute.

22. A vehicle drive apparatus comprising:
a rotating electrical machine provided with a rotor and a stator;
an input member drivingly coupled to the rotor;
a counter gear mechanism;
a differential gear mechanism that distributes, to a first wheel and a second wheel, a driving force transmitted thereto from the rotating electrical machine via the input member and the counter gear mechanism;
a case that houses the rotating electrical machine, the input member, the counter gear mechanism, and the differential gear mechanism; and
a pump portion that suctions a coolant and discharges the coolant into the case, wherein
the rotating electrical machine and the input member are placed on a first axis,
the counter gear mechanism is placed on a second axis different from the first axis,
the differential gear mechanism is placed on a third axis different from the first axis and the second axis,
the input member, the counter gear mechanism, and the differential gear mechanism have portions that are placed on an axial first side with respect to the rotating electrical machine, the axial first side being one side in an axial direction,
a side opposite the axial first side in the axial direction is defined as an axial second side,
the differential gear mechanism is coupled to the first wheel via a shaft member on the third axis, the shaft member having a portion placed on the axial second side with respect to the differential gear mechanism,
the pump portion is placed on an opposite side of an imaginary plane from the second axis and at a location that overlaps at least one of the rotating electrical machine and the differential gear mechanism in an axial view that is along the axial direction, the imaginary plane passing through the first axis and the third axis,
the pump portion is placed on the axial first side with respect to the rotating electrical machine,
the counter gear mechanism is provided with a first gear that meshes with an input gear that rotates as a unit with the input member, and a second gear that meshes with a differential input gear that is provided in the differential gear mechanism, and
the second gear and the differential input gear are placed on the axial second side with respect to the first gear and the input gear.

* * * * *